(12) United States Patent
Tomita et al.

(10) Patent No.: US 7,522,188 B2
(45) Date of Patent: Apr. 21, 2009

(54) VIBRATION REDUCTION APPARATUS HAVING FEEDBACK PATH FOR MOTION SIGNAL, AND CAMERA SYSTEM

(75) Inventors: Hiroyuki Tomita, Kanagawa-ken (JP); Tsuyoshi Matsumoto, Tokyo-to (JP)

(73) Assignee: Nikon Corporation, Tokyo (JP)

( * ) Notice: Subject to any disclaimer, the term of this patent is extended or adjusted under 35 U.S.C. 154(b) by 548 days.

(21) Appl. No.: 11/144,657

(22) Filed: Jun. 6, 2005

(65) Prior Publication Data

US 2005/0270380 A1    Dec. 8, 2005

(30) Foreign Application Priority Data

Jun. 8, 2004    (JP) .............................. 2004-170380
Aug. 27, 2004    (JP) .............................. 2004-248984

(51) Int. Cl.
*H04N 5/228* (2006.01)
(52) U.S. Cl. ................ 348/208.11; 348/208.1; 348/208.2
(58) Field of Classification Search .......... 348/208.99–208.11; 382/255; 396/50, 55
See application file for complete search history.

(56) References Cited

U.S. PATENT DOCUMENTS

| 5,282,044 | A | * | 1/1994 | Misawa et al. ........... 348/208.5 |
| 5,534,967 | A |   | 7/1996 | Matsuzawa |
| 6,130,709 | A |   | 10/2000 | Sekine et al. |
| 6,429,895 | B1 |   | 8/2002 | Onuki |
| 6,573,930 | B2 |   | 6/2003 | Kyuma et al. |
| 6,734,901 | B1 | * | 5/2004 | Kudo et al. ............... 348/208.4 |
| 6,734,902 | B1 | * | 5/2004 | Kawahara ................ 348/208.8 |
| 2003/0030728 | A1 | * | 2/2003 | Kudo ....................... 348/208.6 |
| 2003/0035053 | A1 | * | 2/2003 | Kyuma et al. ............ 348/208.2 |

FOREIGN PATENT DOCUMENTS

| EP | 1 507 408 | 2/2005 |
| JP | 10-145662 | 5/1998 |
| JP | 10-322585 | 12/1998 |
| JP | 11-187308 | 7/1999 |

OTHER PUBLICATIONS

European Search Report, mailed Mar. 16, 2007, and issued in corresponding European Patent Application No. 05012157.3-1241.

\* cited by examiner

*Primary Examiner*—Tuan V Ho
*Assistant Examiner*—Dennis Hogue
(74) *Attorney, Agent, or Firm*—Staas & Halsey LLP

(57) ABSTRACT

A vibration reduction apparatus estimates a reference value from a vibration detection signal, and determines a target drive position from a difference between the vibration detection signal and the estimated reference value. A driving unit drives a vibration reduction mechanism so that the vibration reduction mechanism makes a follow-up movement to the target drive position. The vibration reduction apparatus has a feedback path for feeding back a motion signal to the reference value. A feedback control unit for changing the feedback amount of the motion signal in accordance with a difference in an analytical condition of the motion signal is provided on the feedback path.

21 Claims, 14 Drawing Sheets

FIG. 6
SIMULATION RESULT OF WHEN GAIN IS FIXED
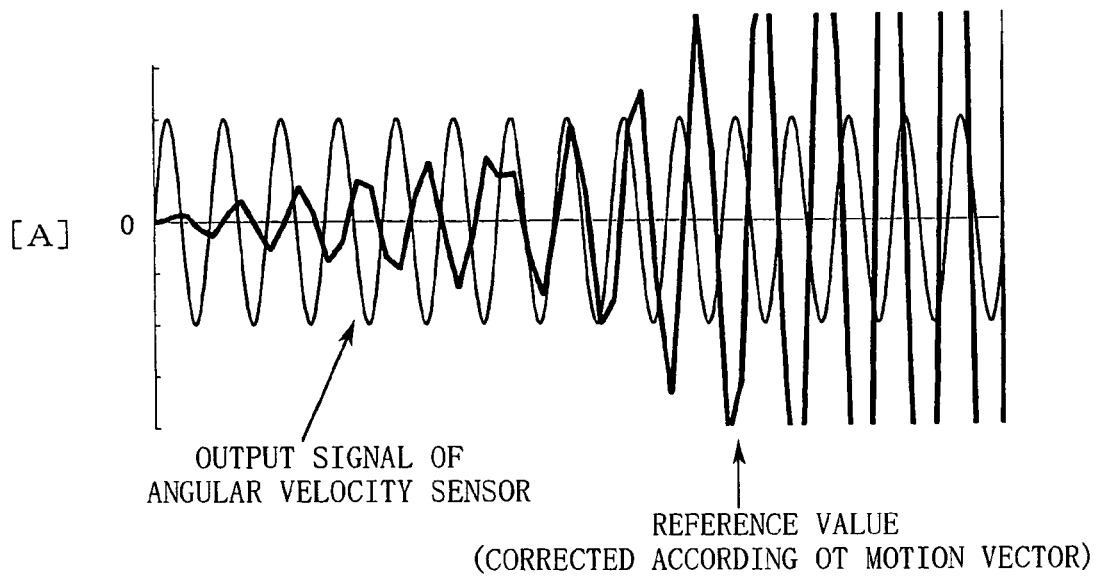
[A]  FRAME RATE : F 1    GAIN : G 2
OUTPUT SIGNAL OF ANGULAR VELOCITY SENSOR
REFERENCE VALUE (CORRECTED ACCORDING OT MOTION VECTOR)
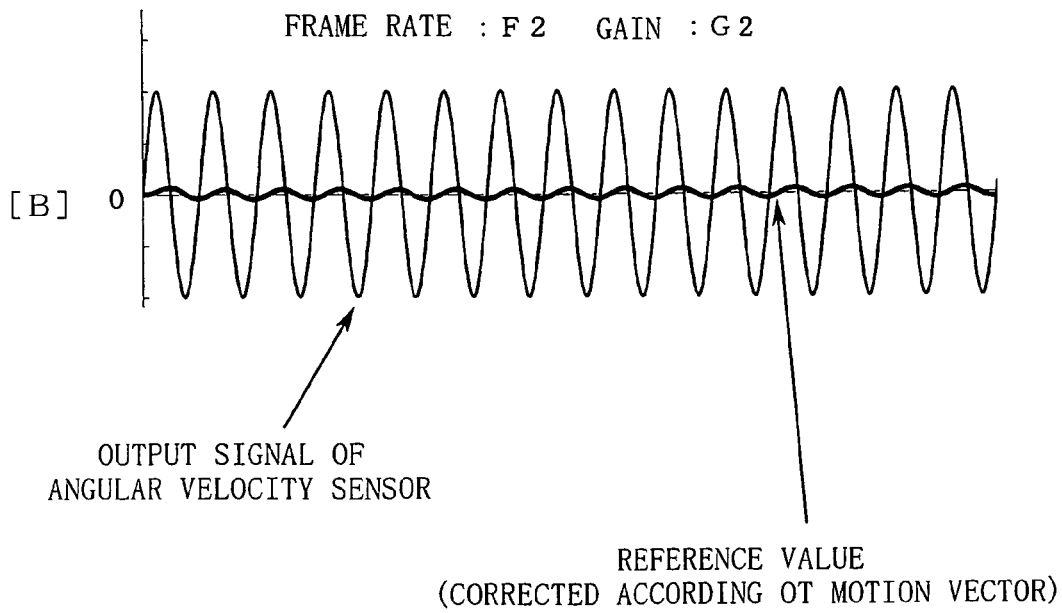
[B]  FRAME RATE : F 2    GAIN : G 2
OUTPUT SIGNAL OF ANGULAR VELOCITY SENSOR
REFERENCE VALUE (CORRECTED ACCORDING OT MOTION VECTOR)

FIG. 7
SIMULATION RESULT OF FIRST EMBODIMENT
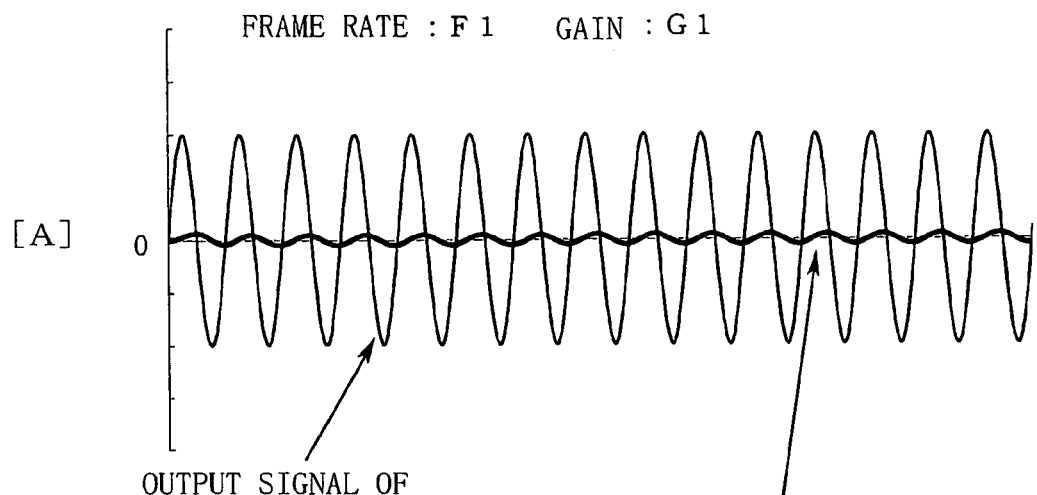
[A]
OUTPUT SIGNAL OF
ANGULAR VELOCITY SENSOR
REFERENCE VALUE
(CORRECTED ACCORDING OT MOTION VECTOR)
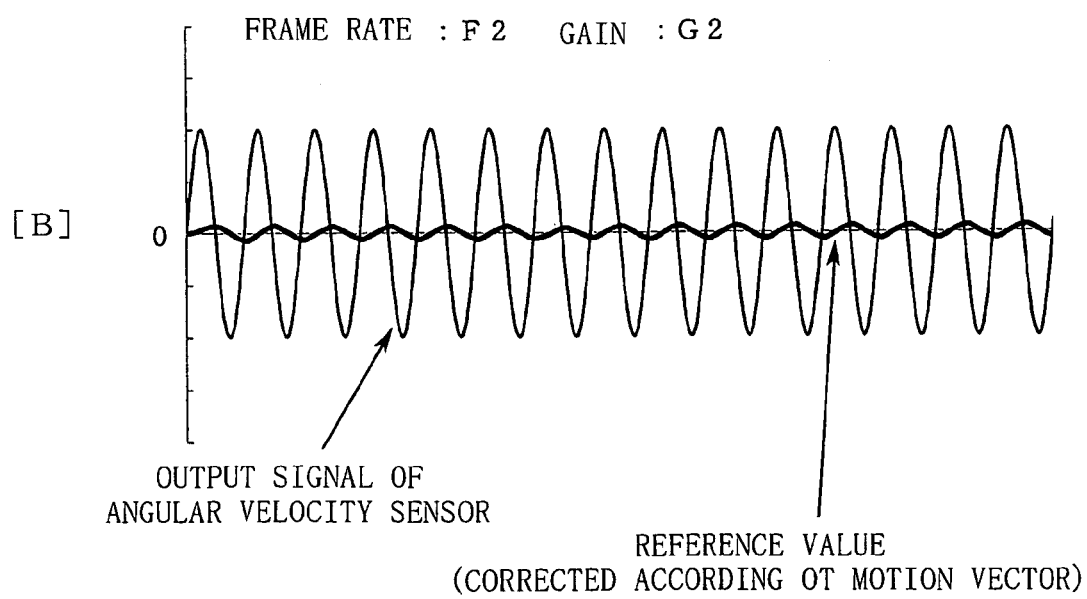
[B]
OUTPUT SIGNAL OF
ANGULAR VELOCITY SENSOR
REFERENCE VALUE
(CORRECTED ACCORDING OT MOTION VECTOR)

VIBRATION REDUCTION APPARATUS HAVING FEEDBACK PATH FOR MOTION SIGNAL, AND CAMERA SYSTEM

CROSS REFERENCE TO RELATED APPLICATIONS

This application is based upon and claims the benefit of priority from Japanese Patent Application No. 2004-170380, filed on Jun. 8, 2004, No. 2004-248984, filed on Aug. 27, 2004, the entire contents of which are incorporated herein by reference.

BACKGROUND OF THE INVENTION

1. Field of the Invention

The present invention relates to a vibration reduction apparatus for reducing an image vibration and a camera system.

2. Description of the Related Art

Techniques for optically reducing an image vibration by a position control on an optical vibration reduction system or an image sensor are known.

For example, according to one conventional technique, a vibration of a camera (including an objective lens) is detected by an angular velocity sensor. Based on a detected angular velocity, the camera moves an optical vibration reduction system so as to cancel out a movement of an object image.

Japanese Unexamined Patent Application Publication Nos. Hei 10-322585 (hereinafter referred to as "Patent document 1") and Hei 10-145662 (hereinafter referred to as "Patent document 2") disclose a technique for suppressing an image vibration in a video camera. The video camera detects motion signals from shot images. Then, the video camera increases the sampling rate by interpolating the motion signals. The video camera increases the anti-vibration performance of the vibration reduction by feeding back an interpolated motion signal to a target drive position of an optical vibration reduction system.

[Problems of the Prior Art]

Incidentally, a sensor output of an angular velocity sensor contains such a component (hereinafter referred to as "reference value") as a DC offset or a drift in addition to an angular velocity. To detect an image vibration correctly, it is necessary to eliminate the reference value from the sensor output carefully.

Usually, such a reference value varies with the temperature of the angular velocity sensor, the elapsed time, etc. in a complicated manner. Therefore, it is impossible to determine a reference value at the time of shipment from a factory.

In view of the above, conventionally, a method of separating and extracting a reference value from an output of the angular velocity sensor is employed. A camera shake caused by a human has dominant frequency components of 2-7 Hz. On the other hand, dominant frequency components of a reference value such as a DC offset or a drift are lower than about 1 Hz. Therefore, a reference value of a sensor output can be estimated by extracting low-frequency components that are lower than 1 Hz from the sensor output of the angular velocity sensor.

A true vibration component can be determined by eliminating (subtracting) the thus-estimated reference value from the sensor output.

However, because of the extraction of low-frequency components, this conventional method has various problems. For example, to extract low-frequency components of lower than 1 Hz from a sensor output, it is necessary to average a past sensor output for a very long period. Extracted low-frequency components have a long delay. Therefore, it is difficult to determine a reference value such as a DC offset or a drift in real time.

Further, part of the vibration component of a camera shake is not eliminated and remains as an error in extracted low-frequency components. If the low-frequency components including such an error are extracted from a sensor output as a reference value of the sensor output, an error is added to the true vibration component.

If vibration reduction is performed so as to cancel out such an error-added vibration component, the image drifts due to, for example, accumulation of errors. Or errors may cause a vibration.

As is understood from the above description, the anti-vibration performance of the vibration reduction depends on how to determine a reference value of a sensor output correctly.

[Problems of Patent Documents 1 and 2]

Incidentally, in Patent documents 1 and 2, a motion signal is fed back to the target drive position of the optical system (this control method is different in configuration from the control method of the present invention in which a motion signal is fed back to the reference value).

Where the control method of Patent documents 1 and 2 is applied to an electronic still camera, the following problems [1] and [2] arise.

[1] First, in electronic still cameras, motion signals are obtained from, for example, shot images for monitor display in a period before a manipulation on the release button. An average shooting interval (e.g., 30 frames/sec) employed in this case is several times to tens of times longer than the shooting interval (e.g., 60 fields/sec) of general video cameras. That is, in many cases, the sampling interval of motion signals in electronic still cameras is longer than in video cameras. In the conventional methods in which a motion signal of such a low frequency is fed back to the target drive position, non-negligible dead times occur and the target drive position follow-up performance and control stability are much lowered. Even an oscillation occurs in the worst case.

[2] In Patent documents 1 and 2, for matching with the target drive position update interval, a prediction value is generated by extrapolating motion signals.

In electronic still cameras, since motion signals have a long sampling interval, discontinuous interpolation errors produced by such extrapolative prediction are larger than in video cameras. Those interpolation errors become target drive position control errors as they are and hence much lower the anti-vibration performance.

Incidentally, in Patent documents 1 and 2, a high-pass filter is provided on a motion signal feedback path. Low-frequency components corresponding to a drift or an offset are cut by the high-pass filter. Therefore, in Patent documents 1 and 2, as a matter of fact, it is impossible to correct for a drift or an offset in a low-frequency range.

[Problems Relating to Motion Signal]

Further, the present inventors realized that the anti-vibration performance is lowered if a motion signal is fed back unconditionally.

For example, in electronic still cameras, the exposure time of shot images (what is called through images or the like) varies to a large extent depending on the field brightness. In this case, the shooting interval also varies, as a result of which motion signals vary.

Further, for example, in a state that vibration reduction is not effective, shot images blur greatly being influenced by a camera shake. In this state, the amplitudes of motion signals are large. On the other hand, the blur of shot images reduces quickly after a start of vibration reduction. Therefore, a large variation occurs between motion signals before and after the start of driving for the vibration reduction.

If motion signals having such a variation (disorder) are fed back as they are, the vibration reduction control is disturbed and the anti-vibration performance is lowered.

SUMMARY OF THE INVENTION

An object of the present invention is therefore to provide a vibration reduction technique that is less prone to be influenced by a variation (disorder) of motion signals.

The invention will be summarized below.

[1] The invention provides a vibration reduction apparatus which reduces an image vibration of an object image in an imaging unit of a camera and includes a vibration reduction mechanism, a vibration detection unit, a reference value generation unit, a target drive position calculation unit, and a driving unit.

The vibration reduction mechanism changes a relative position between the imaging unit and a light beam forming the object image.

The vibration detection unit detects a vibration of the camera and outputs a vibration detection signal.

The reference value generation unit estimates a reference value (i.e., an output of the vibration detection unit in a stationary state that is free of the vibration) of the vibration detection signal on the basis of the vibration detection signal.

The target drive position calculation unit calculates a vibration component as a cause of the image vibration from a difference between the vibration detection signal and the estimated reference value, and calculates a target drive position of the vibration reduction mechanism on the basis of the vibration component.

The driving unit controls the vibration reduction mechanism to follow the target drive position.

In particular, the reference value generation unit includes a feedback path and a feedback control unit.

The feedback path corrects the reference value by acquiring information on a motion signal acquired by analyzing a shot image of the camera and feeding back the motion signal to the reference value.

On the other hand, the feedback control unit changes the amount of feedback, to the reference value, of the motion signal in accordance with an analytical condition of the motion signal.

[2] It is even preferable that the feedback control unit acquire information on a frame rate of a shot image as the analytical condition of the motion signal, and change the feedback amount of the motion signal to the reference value in accordance with a change in the frame rate.

[3] It is preferable that the feedback control unit decrease the feedback amount as the frame rate decreases.

[4] It is even preferable that the feedback control unit decrease the feedback amount more gently as the frame rate decreases.

[5] It is preferable that the feedback control unit set the feedback amount at zero if the frame rate is lower than a predetermined threshold value.

[6] It is even preferable that the feedback control unit set a feedback gain G of the motion signal in the feedback path according to a formula $$G = a \cdot F + b$$

where a and b are constants and F is the frame rate of a shot image.

[7] It is preferable that the feedback control unit suppress the feedback amount of the motion signal at the time of a start of driving of the driving unit, and cancel the suppression of the feedback amount after acquisition of a motion signal generated by analyzing a shot image produced after the start of the driving. In this case, a variation between a shot image produced before and after the start of the driving is employed as a variation of the analytical condition of the motion signal.

[8] It is even preferable that the feedback control unit suppress the feedback amount at least during a period (DLY+ 2/FR) from the start of the driving of the driving unit, where FR is the frame rate of a shot image and DLY is a waiting time from capture of a shot image to generation of the motion signal.

[9] It is preferable that the feedback control unit suppress the feedback amount at least during a period (T1+DLY+1/ FR) from the start of the driving of the driving unit, where T1 is a time lag from the start of the driving of the driving unit to acquisition of a first shot image that is produced after the start of the driving, FR is the frame rate of a shot image, and DLY is a waiting time from capture of a shot image to generation of the motion signal.

[10] It is even preferable that the feedback control unit suppress the feedback amount by performing at least one of a group of operations consisting of setting the feedback amount at zero, lowering a feedback gain, and limiting the motion signal to feed back.

[11] The invention also provides a camera system including any of the above vibration reduction apparatus and a camera that performs vibration reduction using the vibration reduction apparatus.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 6 shows how a reference value varies in the case where the feedback gain G is fixed;

FIG. 7 shows how a reference value varies in the case where the feedback gain G is changed in accordance with a frame rate F;

DETAILED DESCRIPTION OF THE PREFERRED EMBODIMENTS

Embodiments of the present invention will be hereinafter described in detail with reference to the drawings.

First Embodiment

Configuration of First Embodiment

Figure 1:
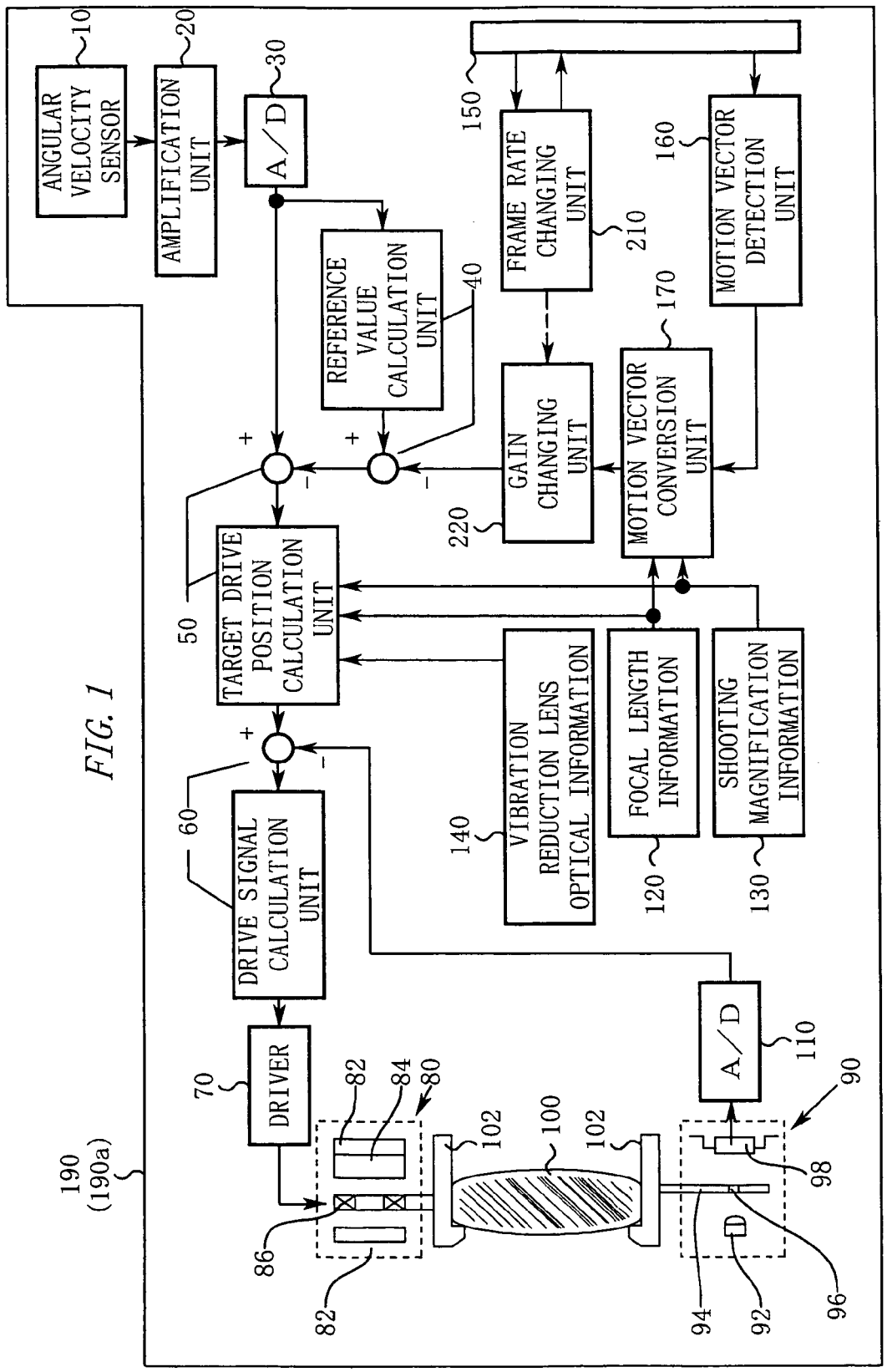
FIG. 1 shows a camera system 190 (including an objective lens 190a and a vibration reduction apparatus)

FIG. 1 shows a camera system 190 (including an objective lens 190a and a vibration reduction apparatus) having an optical vibration reduction mechanism. In the actual camera system 190, an image vibration is reduced in directions of two axes, that is, the horizontal and vertical axes. However, to simplify the description, FIG. 1 shows only a one-axis part of the optical vibration reduction mechanism.

The details of individual units will be described below with reference to FIG. 1.

An angular velocity sensor 10 detects a vibration of the camera system 190 as an angular velocity utilizing a Coriolis force or the like. An amplification unit 20 amplifies an output of the angular velocity sensor 10. A low-pass filter may be added to reduce high-frequency noise in the sensor output. An A/D conversion unit 30 converts an output of the amplification unit 20 to digital angular velocity data.

A reference value calculation unit 40 extracts low-frequency components from the angular velocity data that is output from the A/D conversion unit 30, and estimates an angular velocity reference value (i.e., angular velocity data in a stationary state that is free of a vibration). Further, the reference value calculation unit 40 corrects the reference value using a motion vector feedback path (described later).

A target drive position calculation unit 50 calculates a true angular velocity as a cause of an image vibration by subtracting the reference value from the angular velocity data. The target drive position calculation unit 50 calculates an optical axis angle of the objective lens 190a by integrating the true angular velocity. The target drive position calculation unit 50 determines a target drive position on the basis of the optical axis angle. The target drive position is the position of a optical vibration reduction system 100 for canceling out a displacement of an object image in a state that the objective lens 190a has the above optical axis angle.

To determine a target drive position, the target drive position calculation unit 50 uses focal length information 120, shooting magnification information 130, and optical information 140 of the optical vibration reduction system 100. The focal length information 120 is information that is obtained when necessary from an encoder output of a zoom ring of the objective lens 190a. The shooting magnification information 130 is information that is obtained when necessary from a lens position of the objective lens 190a and an AF driving mechanism. The optical information 140 of the optical vibration reduction system 100 is a vibration reduction coefficient (=(image movement length)/(lens movement length)) and is data stored in the objective lens 190a in advance.

Also provided in the objective lens 190a, a position detection unit 90 detects a position of the optical vibration reduction system 100. The position detection unit 90 is equipped with an infrared LED 92, a PSD (position-sensitive detector (or device)) 98, and a slit plate 94. Light emitted from the infrared LED 92 passes through a slit hole 96 of the slit plate 94 that is attached to a lens barrel 102 of the optical vibration reduction system 100, and is thereby converted to a narrow light beam, which reaches the PSD 98. The PSD 98 outputs a signal that represents a reception position of the light beam. This signal is converted to digital data by an A/D conversion unit 110, whereby position data of the optical vibration reduction system 100 is obtained.

A drive signal calculation unit 60 calculates a deviation between the position data and the target drive position and calculates a drive signal in accordance with the deviation. For example, a drive signal is calculated by a PID control in which a proportionality term, an integration term, and a differentiation term of the deviation are added together with a prescribed ratio.

A driver 70 causes a drive current corresponding to the calculated drive signal (digital signal) to flow through a driving mechanism 80.

The driving mechanism 80 is composed of a yoke 82, a magnet 84, and a coil 86. The coil 86 is fixed to the lens barrel 102 of the optical vibration reduction system 100 and is disposed in a magnetic circuit that is formed by the yoke 82 and the magnet 84. The optical vibration reduction system 100 can be moved perpendicularly to the optical axis by causing the drive current of the driver 70 to flow through the coil 86.

The optical vibration reduction system 100 is part of the image forming optical system of the objective lens 190a. An image vibration of an object image can be suppressed by shifting the image forming position of the object image by moving the optical vibration reduction system 100 to the target drive position.

On the other hand, the imaging surface of the image sensor 150 is disposed in the image space of the objective lens 190a. The image sensor 150 shoots an object image formed on the imaging surface. The shot image is displayed on a monitor screen (not shown) and output to a motion vector detection unit 160.

The motion vector detection unit 160 detects a motion vector including a residual vibration by detecting a motion of shot images in the time-axis direction. A motion vector conversion unit 170 converts the motion vector so that it is expressed in the same scale as the reference value using the focal length information 120 and the shooting magnification information 130. A resulting motion vector is converted by a gain changing unit 220 (feedback control unit) to a feedback vector, which is fed back to the reference value of the reference value calculation unit 40.

The gain changing unit 220 changes a feedback gain G in accordance with information on a frame rate F of shot images that is acquired by a frame rate changing unit 210.

[Calculation of Motion Vector]

Figure 2:
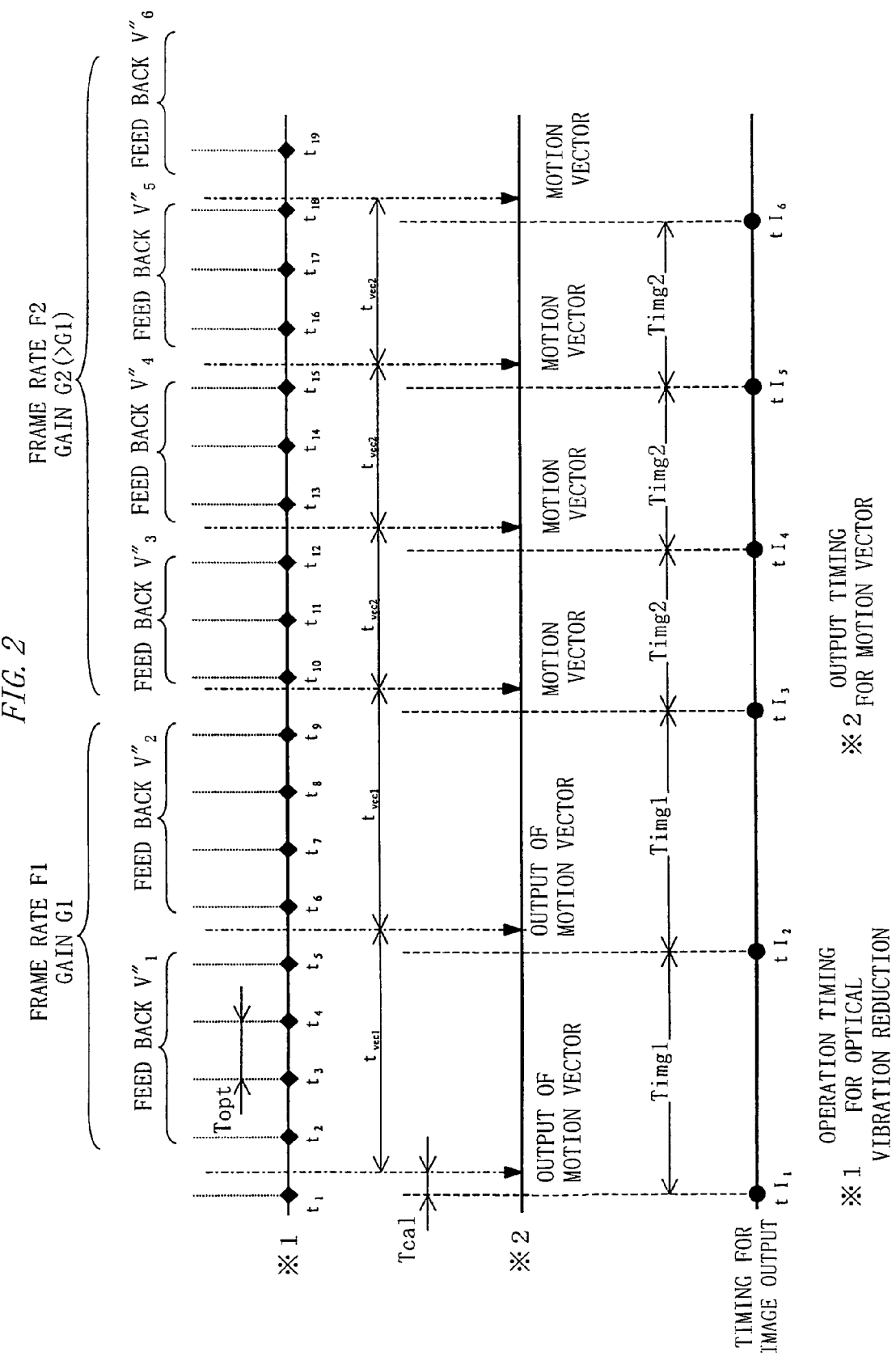
FIG. 2 illustrates operation timing of optical vibration reduction.
Figure 3:
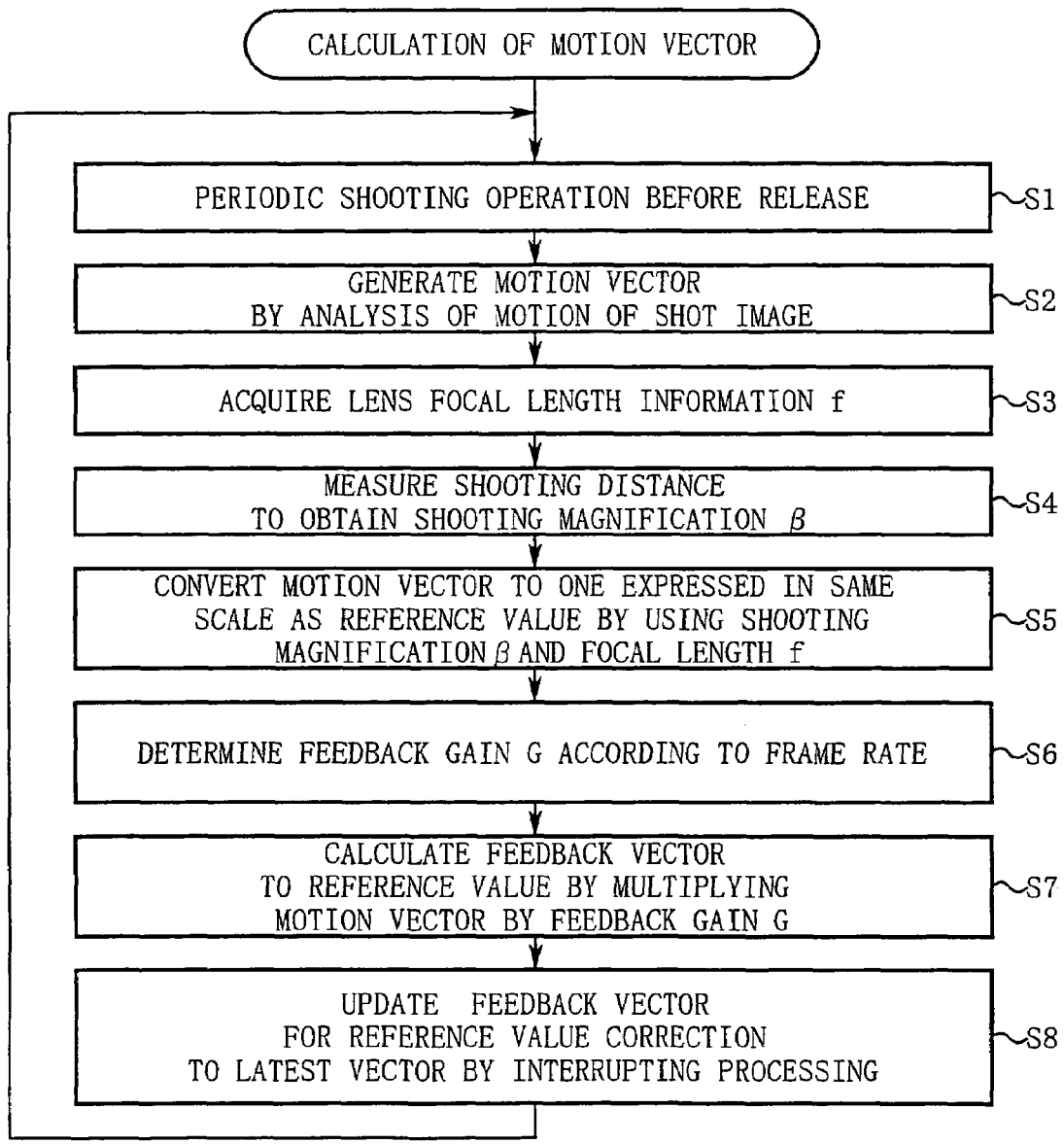
FIG. 3 is a flowchart showing a motion vector calculation procedure.

FIG. 2 illustrates operation timing of optical vibration reduction. FIG. 3 is a flowchart showing a motion vector calculation procedure.

The motion vector calculation procedure will be described below with reference to FIGS. 2 and 3.

Step S1: The image sensor 150 successively reads out shot images by thinning out read lines. These shot images are used for monitor display, exposure and focal point controls and a white balance adjustment control, moving image recording, etc.

The frame rate changing unit 210 keeps the output signal level of the image sensor 150 in a prescribed, proper range by controlling the exposure time of a shot image on a frame-by-frame basis by increasing or decreasing the frame rate F of shot images in a range of 10-60 frames/sec.

As a result, for a low-luminance object, the exposure time per frame is set longer and the frame rate F of shot images are made lower.

Conversely, for a high-luminance object, the exposure time per frame is set shorter and the frame rate F of shot images are made higher.

In FIG. 2, the frame rate F of shot images varies halfway from a time interval Timg1 to a time interval Timg2 as the luminance of an object varies.

Step S2: The motion vector detection unit 160 determines a motion vector from, for example, an inter-frame difference between shot images. Examples of the motion vector detection method are a space/time gradient method and a block matching method.

Step S3: The motion vector conversion unit 170 acquires focal length information 120 of the objective lens 190a.

Step S4: The motion vector conversion unit 170 acquires shooting magnification information 130 of the objective lens 190a.

Step S5: A motion vector that is output from the motion vector detection unit 160 is information on a displacement on the image surface. Therefore, the motion vector conversion unit 170 converts the motion vector so as to be expressed in the same scale (angular velocity scale) as the reference value. For example, the following conversion formula is used:

$$V' = Z \cdot \tan^{-1}[V/\{f(1+\beta)^2\}] \cong Z \cdot [V/\{f(1+\beta)^2\}] \quad (1)$$

where V is the motion vector before the conversion, V' is the motion vector after the conversion, f is the focal length, β is the shooting magnification, and Z is a constant corresponding to the pixel interval of the image sensor 150.

As shown in FIG. 2, the above motion vector calculation processing is completed after a delay of a calculation time Tcal from each shooting time point.

Step S6: The gain changing unit 220 acquires information on a current frame rate F from the frame rate changing unit 210. The gain changing unit 220 determines a feedback gain G corresponding to this frame rate F according to a prescribed conversion formula or a corresponding relationship. The details of the conversion formula or the corresponding relationship will be described later.

Step S7: The gain changing unit 220 calculates a feedback vector GV' by multiplying the motion vector V' that is output from the motion vector conversion unit 170 by the feedback gain G.

Step S8: The gain changing unit 220 updates, to the latest feedback vector GV' that was calculated at step S7, a feedback vector that it holds for reference value correction. After completion of the update operation, the gain changing unit 220 causes the process to return to step S1.

[Vibration Reduction Operation]

Figure 4:
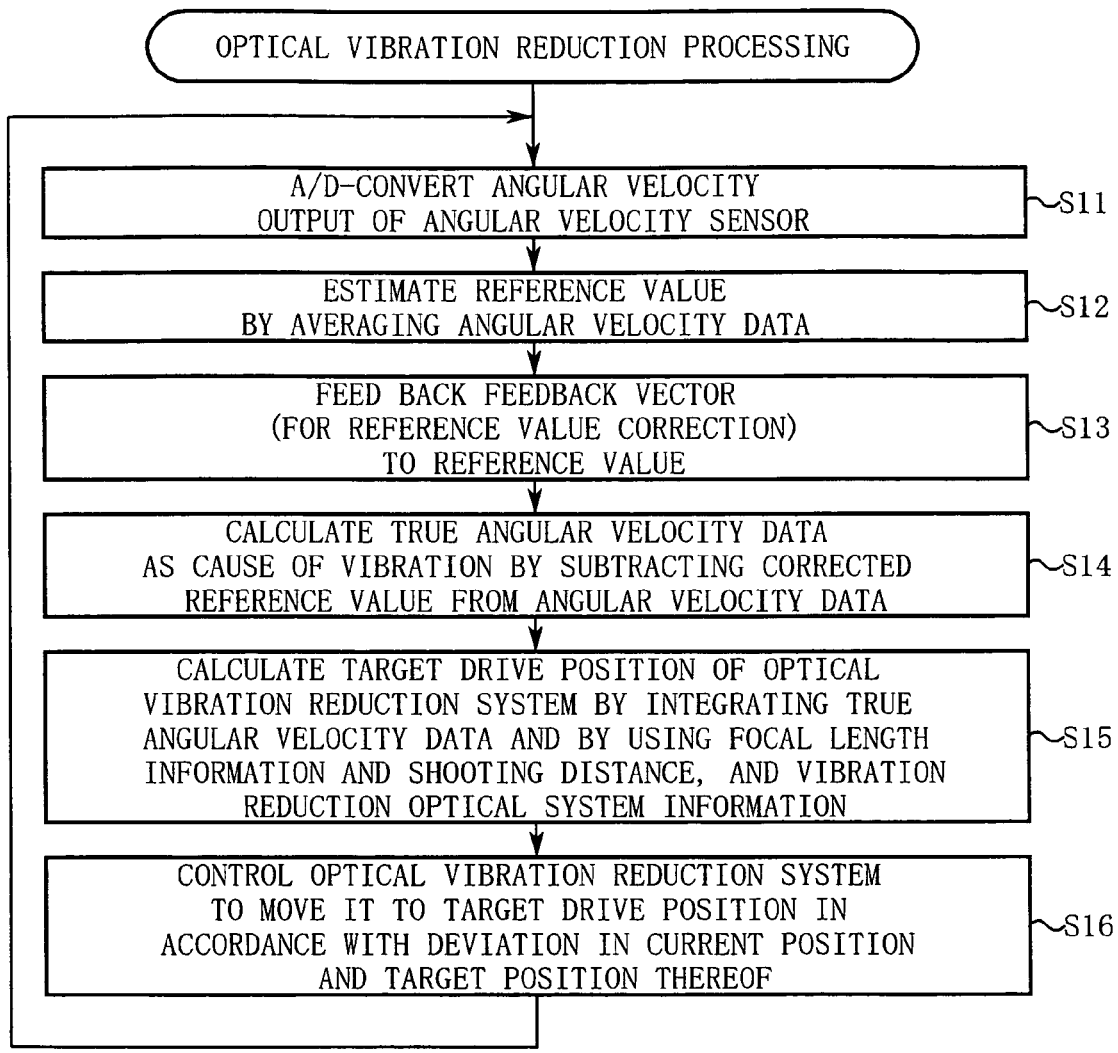
FIG. 4 is a flowchart showing a control operation for the optical vibration reduction.

FIG. 4 is a flowchart showing a control operation for the optical vibration reduction.

Next, the control operation for the optical vibration reduction will be described with reference to FIG. 4.

Step S11: The A/D conversion unit 30 A/D-converts an angular velocity output of the angular velocity sensor 10 at a sampling interval Topt.

Step S12: The reference value calculation unit 40 estimates a reference value Wo of angular velocity data obtained by the A/D conversion by subjecting it to moving averaging and low-pass filter processing.

Step S13: The reference value calculation unit 40 acquires information on an updated feedback vector GV' from the gain changing unit 220, and corrects the reference value Wo according to the following equation:

$$Wo' = Wo - Gv' \quad (2)$$

where Gv' is a component of the feedback vector GV' in the vibration reduction direction.

In general, if a corrected reference value Wo' has an error, a residual vibration occurs in a shot image that has been subjected to the vibration reduction. The error in the reference value Wo' is decreased by detecting the residual vibration in the form of a motion vector V' and feeding back it to the reference value according to Equation (2).

As the error in the reference value Wo' decreases, the motion vector V' decreases gradually. When the motion vector V' finally becomes so small as to be regarded as zero, the reference value Wo' becomes a value that correctly includes a drift output or a DC offset of the angular velocity sensor 10.

Incidentally, in the optical vibration reduction, to enhance the follow-up performance of the optical vibration reduction system 100, the target drive position and the reference value are updated at the sampling interval Topt which is shorter than the shooting interval Timg (see FIG. 2). As a result, a new motion vector cannot be used every time the reference value is corrected. Therefore, it is preferable to correct the reference value using one motion vector V' repeatedly until the next motion vector is acquired.

Step S14: The target drive position calculation unit 50 calculates true angular velocity data, which is a cause of an image vibration, by subtracting the corrected reference value Wo' from the angular velocity data that is output from the A/D conversion unit 30.

Step S15: The target drive position calculation unit 50 calculates a displacement of the optical axis angle of the objective lens 190a by integrating the true angular velocity data. The target drive position calculation unit 50 calculates, from this optical axis angle value, a position of the optical vibration reduction system 100 (i.e., target drive position) that is necessary for canceling out a displacement of the image forming position of the object image.

For example, a target drive position $\theta(T_k)$ is calculated according to the following formulae:

$$C = f \cdot (1+\beta)^2 / K \quad (3)$$

$$\theta(T_k) = \theta(T_{k-1}) + C \cdot \{W(T_k) - Wo'\} \quad (4)$$

where f is the focal length, β is the shooting magnification, $\theta(T_{k-1})$ is the preceding target drive position, $W(T_k)$ is the latest angular velocity data, and K is a vibration reduction coefficient. The vibration reduction coefficient K is measured actually in advance according to the following formula:

K=(displacement of object image)/(displacement of optical vibration reduction system 100).

Step S16: The drive signal calculation unit 60 acquires information on the target drive position from the target drive position calculation unit 50 and controls the optical vibration reduction system 100 to follow the target drive position.

Next, several examples of setting of a feedback gain G characteristic, which is an important feature of the invention, will be described.

FIRST SETTING EXAMPLE

Figure 5:
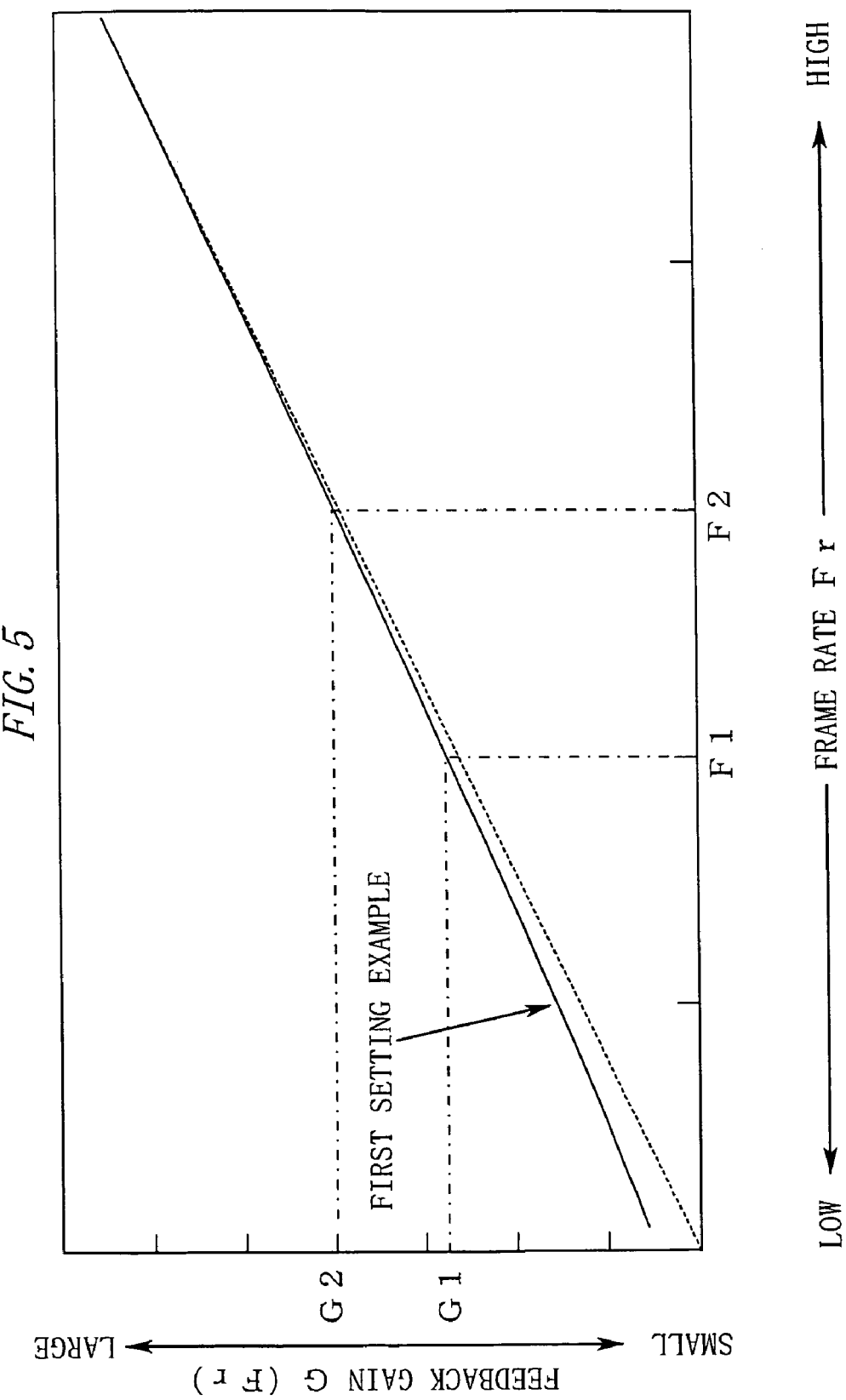
FIG. 5 shows an example of setting of a feedback gain G characteristic.

A solid-line curve shown in FIG. 5 represents a first example of setting of a feedback gain G characteristic. In FIG. 5, the horizontal axis represents the frame rate F and the vertical axis represents the feedback gain G.

The feedback gain G characteristic represented by the solid-line curve of FIG. 5 is set by an experiment or a simulation (calculation) according to the following procedure:

(1) The camera 190 is vibrated in a state that the optical vibration reduction system 100 is locked, whereby an object image is forcibly vibrated at a constant amplitude with respect to the imaging surface. Alternatively, an object is vibrated, whereby an object image is vibrated at a constant amplitude with respect to the imaging surface.

(2) The image sensor 150 is driven at a prescribed frame rate F, whereby vibrating shot images (plural frames) are obtained.

(3) The shot images (plural frames) are given to the motion vector detection unit 160 and motion vector conversion unit 170, whereby a shot image displacement (components of a motion vector V') between successive frames is determined.

(4) A conversion factor S(F) is calculated by dividing the above-given amplitude (converted to a value in the angular velocity scale) on the image surface by the above-calculated shot image displacement (converted to a value in the angular velocity scale).

(5) Steps (2)-(4) are executed repeatedly while the frame rate F is varied in order in the frame rate range (e.g., 10-60 frames/sec) that is employed by the frame rate changing unit 210, whereby conversion factors S(F) are calculated at respective frame rates F. Feedback gains G are obtained by multiplying the conversion factors S(F) by a prescribed constant P.

It is preferable to determine the value of the constant P by making adjustments from the viewpoints of, for example, properly suppressing over-correction of the reference value Wo' and obtaining a proper, shortened settling time of the reference value Wo'.

In the thus-set characteristic, the feedback gain G varies approximately in proportion to the frame rate F in a range where the frame rate F is relatively high (see FIG. 5). This makes it possible to cancel out a variation (increase or decrease) of the motion vector V' that is in inverse proportion to the frame rate F and to thereby keep the feedback vector GV' stable. As a result, even if the frame rate F decreases in a state that an image drift exists, the loop gain of the motion vector V' does not become too large and over-correction of the reference value is prevented, whereby the reference value is caused to converge more quickly.

On the other hand, the feedback gain G characteristic is such that its curve is gentler as the frame rate F decreases. In general, when the frame rate F is made lower and the sampling interval is larger, the probability that an image vibration is shot at positions excluding peak positions becomes higher, in which case a detected width of the image vibration is smaller than a true value. The curve of the feedback gain G characteristic of FIG. 5 decreases so as to cancel out such a reduction in detection sensitivity. As a result, an insufficient loop gain of the motion vector V' that is caused by the lowering of the frame rate F is compensated for and the speed of convergence of the reference value can be increased.

Next, a simulation result indicating a specific advantage of the above-described reference value correction using the feedback gain G will be described.

For example, in FIG. 2, the frame rate F varies halfway from F1 to F2 because the object luminance varies during a vibration reduction operation.

FIGS. 6[A] and 6[B] show a comparative example in which the feedback gain is fixed to G2 (>G1) irrespective of the frame rate variation. When the frame rate F is lowered to F1, the apparent signal level of the motion vector V' increases and hence the feedback amount becomes excessive. As a result, the reference value is over-corrected as shown in FIG. 6[A] and finally diverges.

In contrast, FIGS. 7[A] and 7[B] show an example in which the feedback gain G is changed as the frame rate F is varied from F1 to F2. The gains G1 and G2 are ones obtained by referring to the feedback gain G characteristic of FIG. 5. Changing the feedback gain G in this manner makes it possible to keep the reference value at a proper level stably.

SECOND SETTING EXAMPLE

Figure 8:
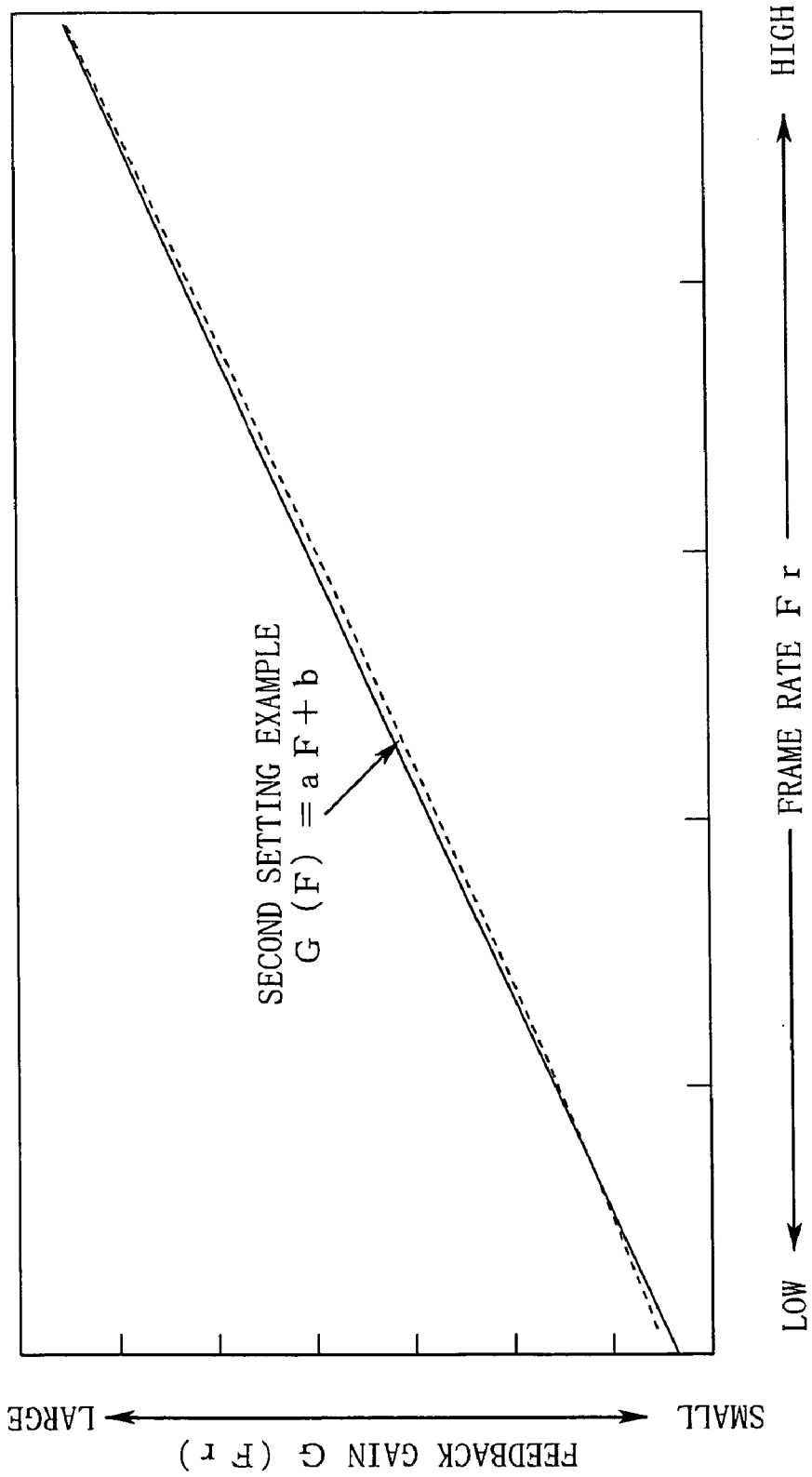
FIG. 8 shows another example of setting of a feedback gain G characteristic.

A solid line FIG. 8 represents a second example of setting of a feedback gain G characteristic.

This feedback gain G characteristic is a straight-line approximation of the feedback gain G characteristic of the first setting example (the solid-line curve in FIG. 5), and is represented by the following formula:

$$G = a \cdot F + b \quad (5)$$

where a and b are positive constants and F is the frame rate of shot images.

In this characteristic, the feedback gain G varies approximately in proportion to the frame rate F in a range where the frame rate F is sufficiently high.

This proportional relationship between the frame rate F and the feedback gain G can cancel out a phenomenon that the motion signal varies in inverse proportion to the frame rate F.

On the other hand, as the frame rate F approaches zero, the feedback gain G of Equation (5) finally reaches the lower limit gain b instead of zero. That is, even if the frame rate F becomes very low, the lowering of the feedback gain G stops at the lower limit gain b.

As a result, the setting of the lower limit gain b can compensate for a phenomenon that as the frame rate F decreases the feedback amount of the motion signal becomes insufficient because ends (peak positions) of an image vibration are not detected.

THIRD SETTING EXAMPLE

Figure 9:
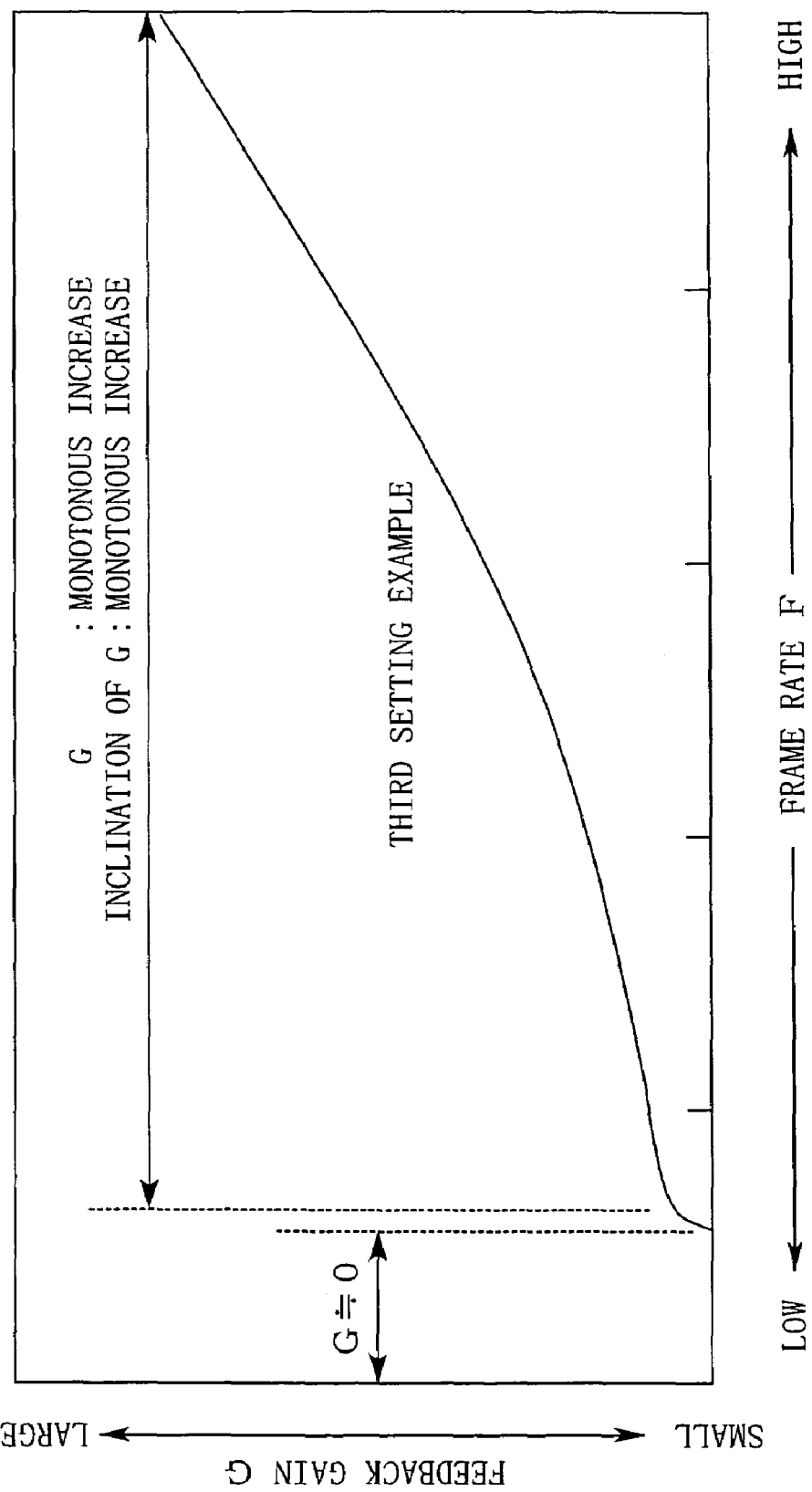
FIG. 9 shows a further example of setting of a feedback gain G characteristic.

A solid-line curve shown in FIG. 9 represents a third example of setting of a feedback gain G characteristic.

This characteristic is based on the characteristic of the first setting example (FIG. 5) and is different from the latter in that a portion where the frame rate F is very low is replaced by a characteristic G≈0.

In general, when the frame rate F is very low, a high-speed image vibration cannot be detected correctly and a false vibration component due to low-frequency folding-back components appears in a motion signal.

If the frame rate F decreases further, inter-frame motions of shot images become rough and a marked reduction occurs in the continuity of the image vibration width and the vibration direction. As a result, the motion signal tends to contain a detection error and hence becomes very low in reliability.

In view of the above, in the third setting example, when the frame rate F becomes very low, the feedback gain G is forcibly set at zero. Setting the feedback gain G at zero in this manner makes it possible to prevent mixing of a low-reliability motion signal into the reference value and to thereby prevent lowering of the anti-vibration performance.

Advantage etc. of First Embodiment

Advantages of the first embodiment will be described below.

(1) In the first embodiment, the reference value of a vibration detection signal is corrected by using a motion signal that is obtained by analyzing shot images of the camera.

In general, if the reference value has an error, it causes a vibration component detection error and a residual vibration occurs in a shot image. In the first embodiment, the residual vibration in the shot image is detected as a motion signal and the reference value is corrected by using the motion signal. This feedback action can suppress an error in the reference value.

The reference value being correct makes it possible to correctly determine vibration component values by the vibration detection unit and to thereby further increase the anti-vibration performance of the optical vibration reduction.

In particular, the reference value which is employed as the feedback destination in the first embodiment is a signal that is far lower in frequency than the target drive position having a short update interval. Therefore, even if motion signals having a long sampling interval are fed back, the probability of occurrence of excessive over-correction in the control system is low. In this respect, the feedback path of the first embodiment is superior in the fundamental performance of the control system and is expected to provide a stable and proper control response.

Further, the inventors found that the feedback effect (the correctness of the reference value correction and the speed of convergence) is influenced by a variation of the frame rate of shot images.

Based on this founding, in the first embodiment, the function of acquiring information on a frame rate of shot images and changing the gain of the motion signal that is fed back to the reference value in accordance with a variation of the frame rate.

This gain changing function makes it easier to change the feedback gain G properly in accordance with a variation of the frame rate. As a result, the inventors have succeeded in decreasing the error of the reference value correction and the delay of convergence and have thereby attained stable and reliable anti-vibration performance.

(2) Next, advantages of the first embodiment will be described by assuming that an image is drifting uniformly in one direction. If the frame rate decreases in this state, the inter-frame drift displacement becomes larger and the value of the motion signal increases in inverse proportion to the decrease of the frame rate.

In this case, the feedback amount of the motion signal substantially increases in inverse proportion to the decrease of the frame rate. The increase of the feedback amount makes the reference value correction more prone to over-correction (overshoot and undershoot) and decreases the speed of convergence of the reference value. The delay of convergence of the reference value is a cause of lowering of the anti-vibration performance of the vibration reduction.

Further, if the frame rate decreases and the feedback amount of the motion signal exceeds a gain margin of the system, an unstable state is established and the reference value diverges, as a result of which the vibration reduction itself is made uncontrollable.

In view of the above, in the first embodiment, the gain G of the motion signal that is fed back to the reference value is lowered as the frame rate decreases. This operation makes it possible to prevent the feedback amount of the motion signal from increasing as the frame rate decreases.

It is even preferable to lower the feedback gain G in proportion to the decrease of the frame rate. Such a proportional variation makes it possible to cancel out the increase of the feedback amount of the motion signal due to the decrease of the frame rate.

The above operations make it possible to suppress over-correction of the reference value correction due to a decrease of the frame rate and to thereby increase the speed of convergence of the reference value. In addition, the reference value is less prone to diverge even if the frame rate becomes extremely low. This makes it possible to lower the lower limit of the frame rate that the vibration reduction can accommodate and to thereby increases the stability of the vibration reduction further in a low-luminance shooting condition.

(3) Next, advantages of the first embodiment will be described by assuming that the frame rate is comparable with the frequency of an image vibration.

First, assume that an image vibration occurs. In this state, if the frame rate is sufficiently high, ends (peak positions) of the image vibration can be shot properly and a width of the image vibration can be detected correctly.

On the other hand, as the frame rate decreases so as to come close to two times the frequency of the image vibration, the probability that exact peak positions of the image vibration are not shot increases and a detected width of the image vibration becomes smaller than the true value.

Therefore, if the feedback gain G is lowered simply in proportion to the decrease of the frame rate, the feedback amount of the motion signal becomes substantially insufficient. In this case, the reference value correction comes close to underdamping and the speed of convergence of the reference value decreases.

In view of the above, in the first embodiment, the curve of the feedback gain G characteristic is made gentler as the frame rate decreases (i.e., the feedback gain G is "lifted" gradually so as not to fall below the proportionality line). This makes it possible to compensate for the insufficient feedback amount of the motion signal and to thereby increase the speed of convergence of the reference value.

(4) Next, advantages of the first embodiment will be described by assuming that the frame rate is low as compared with the frequency of the image vibration.

First, assume that an image vibration occurs. In this state, if the frame rate is sufficiently high, the image vibration can be detected by properly sampling it.

On the other hand, if the frame rate is lower than two times the frequency of the image vibration, the image vibration cannot be detected from sampling images as is apparent from the sampling theorem. In this case, a false vibration component due to low-frequency folding-back appears in a motion signal (like a phenomenon that wheels are seen as if they were being rotated in the reverse direction in a movie).

If a motion signal including such a false vibration component is fed back, the false vibration component is mixed into the reference value. Since the false vibration component is reflected in the target drive position as it is, the anti-vibration performance of the vibration reduction is lowered.

In view of the above, in the first embodiment, the feedback gain G is set at zero if the frame rate is lower than a predetermined threshold value. The term "zero" means "substantially zero," that is, it means that the feedback gain G is so low that its influence on a control operation is negligible.

Setting the feedback gain G at zero in accordance with the frame rate in this manner makes it possible to prevent mixing of a false vibration component into the reference value and to thereby prevent reduction of the anti-vibration performance due to the false vibration component.

(5) Next, advantages of the first embodiment will be described by assuming that the frame rate is very low.

If the frame rate becomes very low, inter-frame image motions of shot images become rough and a marked reduction occurs in the continuity of the image vibration width and the vibration direction. In this state, errors tend to occur in pattern matching etc. of an image motion analysis and the reliability of the motion signal is much lowered.

In view of the above, in the first embodiment, the feedback gain G is set at zero if the frame rate is lower than a predetermined threshold value. Setting the feedback gain G at zero in this manner makes it possible to prevent mixing of a low-reliability motion signal into the reference value and to thereby prevent reduction of the anti-vibration performance.

(6) In the first embodiment (second setting example), the feedback gain G characteristic is set according to the following formula:

$$G = a \cdot F + b \tag{5}$$

where a and b are positive constants and F is the frame rate of shot images.

If the frame rate F is sufficiently high, the following approximate formula holds:

$$G/F = a + b/F \approx a.$$

That is, if the frame rate F is sufficiently high, the feedback gain G varies approximately in proportion to the frame rate F with the proportionality constant a.

This approximately proportional relationship between the frame rate F and the feedback gain G can suppress a phenomenon that the motion signal varies in inverse proportion to the frame rate F in a state that an image drift occurs.

On the other hand, as the frame rate F approaches zero, the feedback gain G of Equation (5) finally reaches the lower limit gain b instead of zero. That is, even if the frame rate F becomes very low, the lowering of the feedback gain G stops at the lower limit gain b and excessive lowering of the feedback gain G can be prevented.

As a result, the setting of the lower limit gain b can compensate for a phenomenon that as the frame rate F decreases the feedback amount of the motion signal becomes insufficient because ends (peak positions) of an image vibration are not detected.

Although the formula used is simple, the above plural advantages can be obtained in an approximated manner.

Next, another embodiment will be described.

Second Embodiment

Configuration of Second Embodiment

Figure 10:
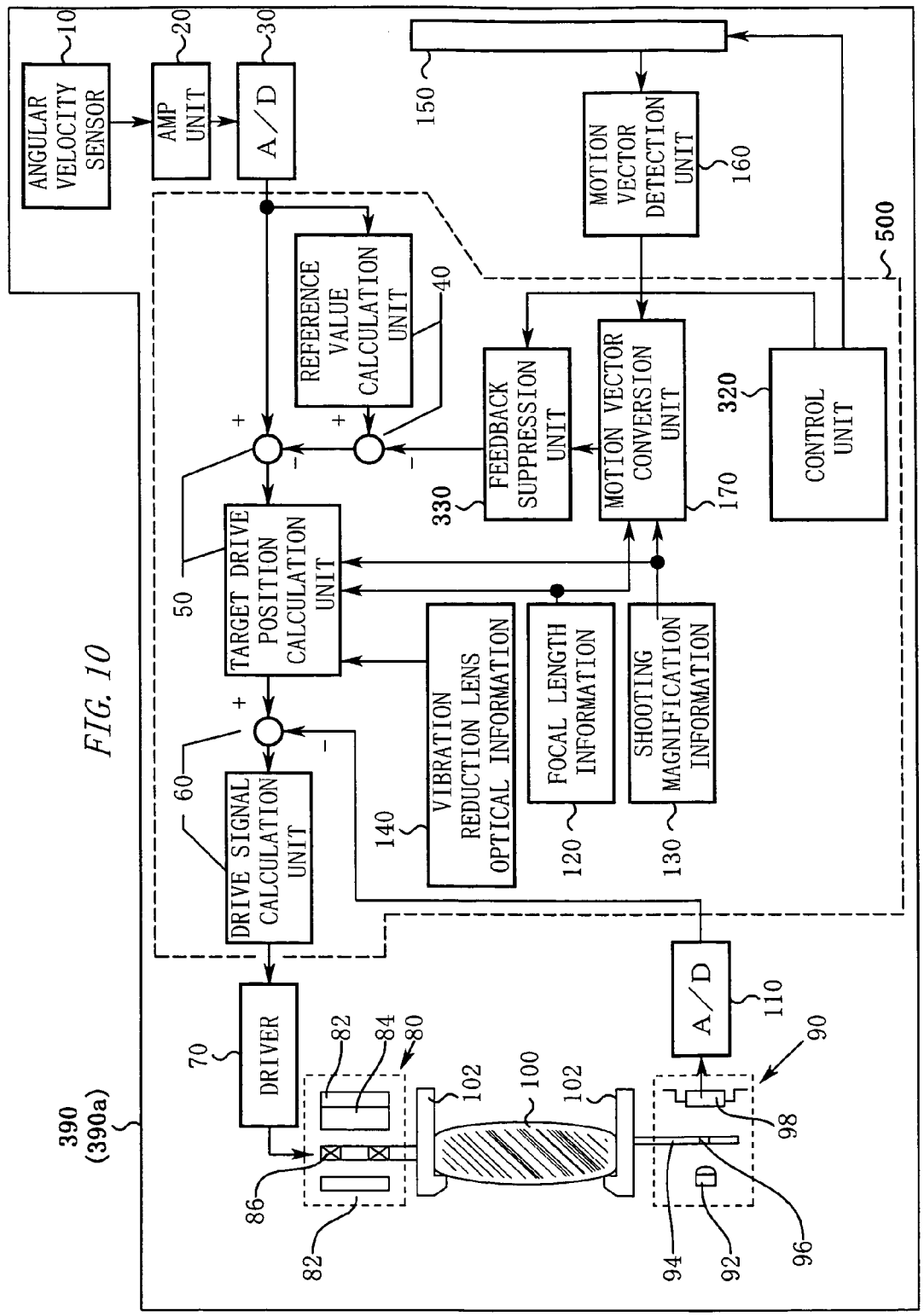
FIG. 10 shows a camera system 390 (including a vibration reduction apparatus) having a vibration reduction mechanism.

FIG. 10 shows a camera system 390 (including a vibration reduction apparatus) having a vibration reduction mechanism. Units and components having the same ones in the first embodiment (FIG. 1) will not be described below redundantly.

The camera system 390 is equipped with a control unit 320 and a feedback suppression unit (feedback control unit) 330. The control unit 320 controls operation of the image sensor 150 and the feedback suppression unit 330. On the other hand, the feedback suppression unit 330 feeds back a motion vector to the reference value of the reference value calculation unit 40 while adjusting its feedback amount. A range implemented by a microprocessor 500 is indicated by a broken line in FIG. 10.

Operation of Second Embodiment

Figure 11:
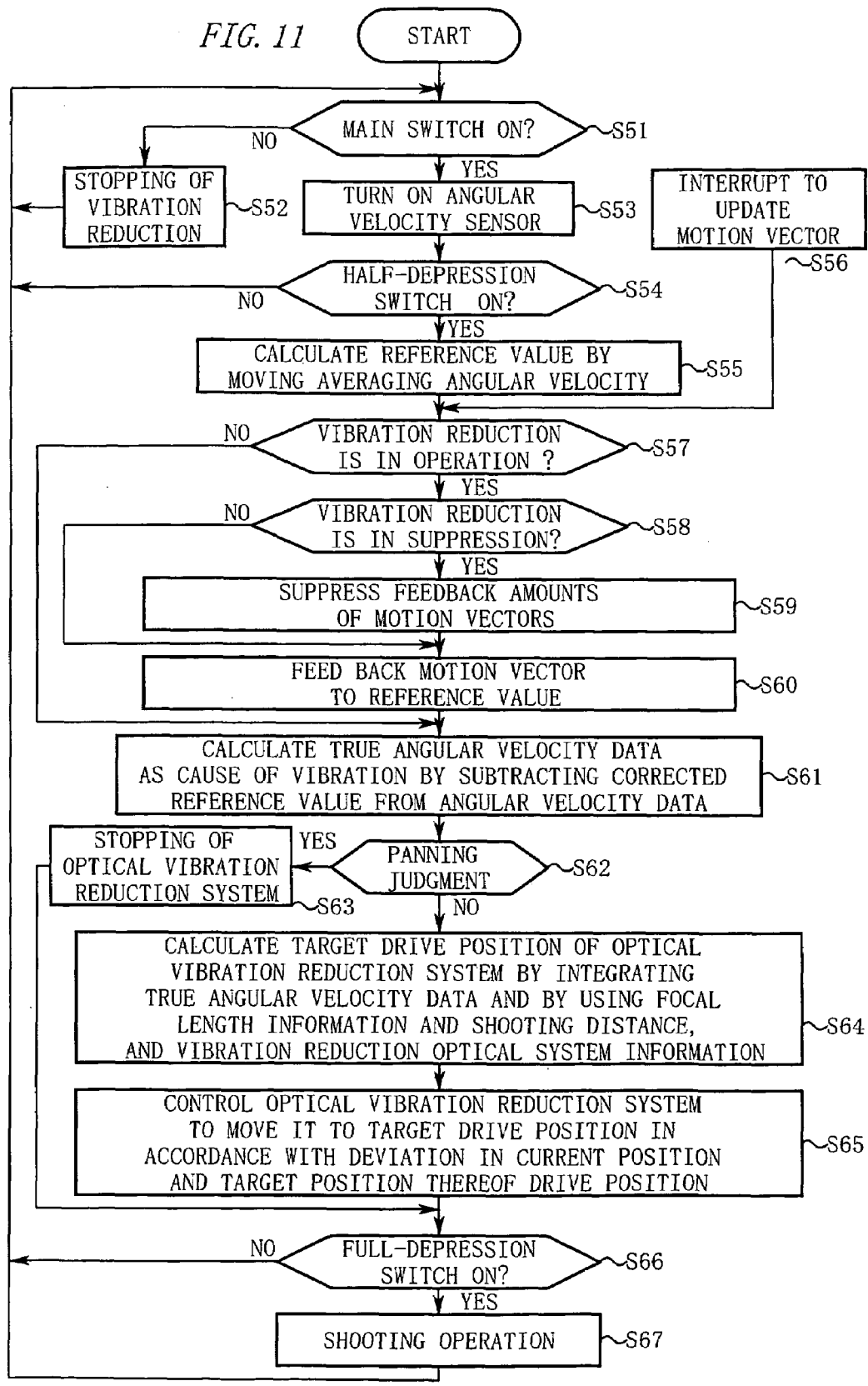
FIG. 11 is a flowchart showing a control operation for vibration reduction.
Figure 12:
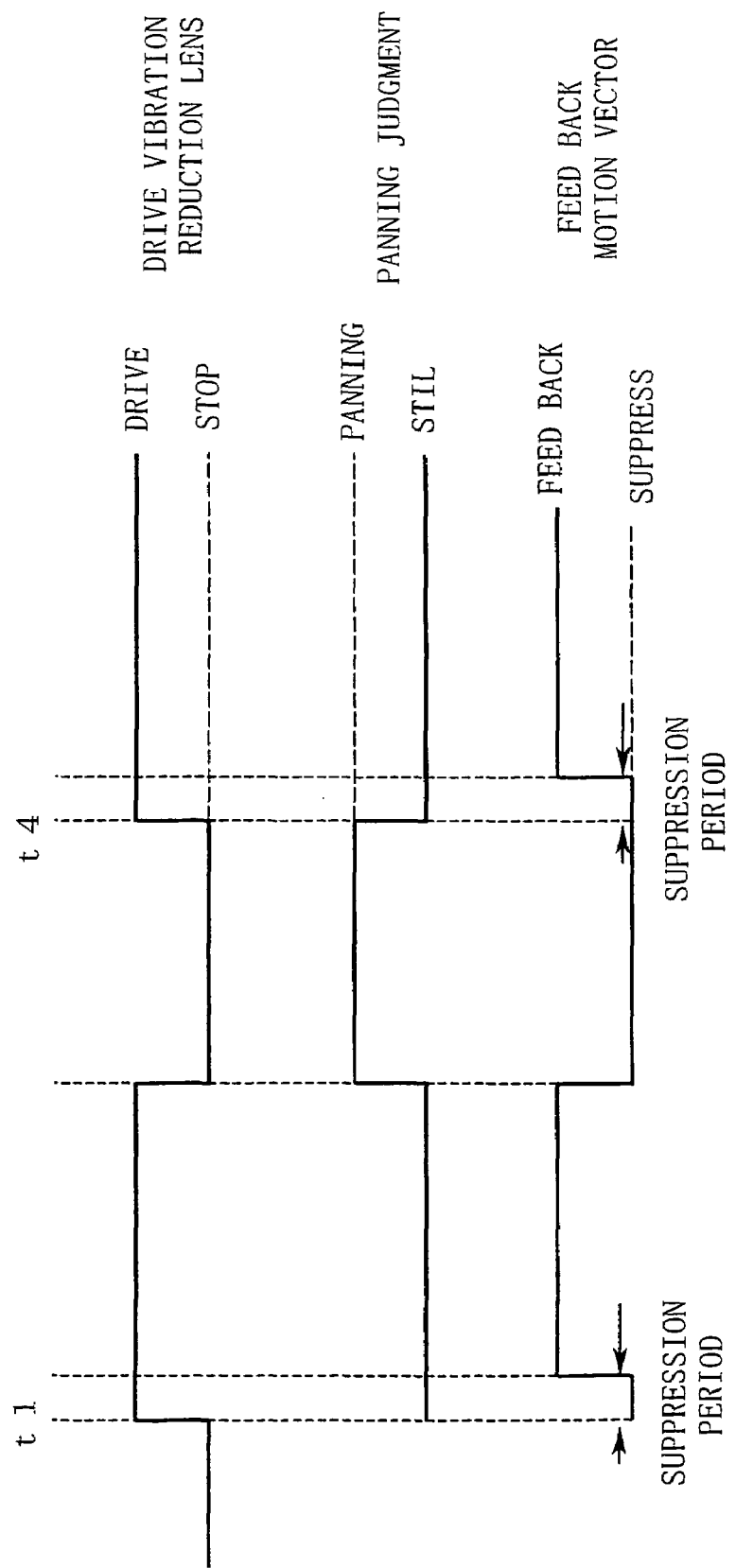
FIG. 12 illustrates the timing of a motion vector feedback operation.

FIG. 11 is a flowchart showing a control operation for the vibration reduction. FIG. 12 illustrates the timing of a motion vector feedback operation.

A vibration reduction operation will be described below with reference to FIGS. 11 and 12.

Step S51: The control unit 320 judges the state of a main switch (not shown) of the camera system 390.

If it is an off-state, the control unit 320 causes the process to move to step S52.

If it is an on-state, the control unit 320 causes the process to move to step S53.

Step S52: The control unit 320 stops the driving of the vibration reduction system according to the following procedure:

(1) Stops the driving of the vibration reduction lens.
(2) Stops the calculation of the drive signal.
(3) Stops the calculation of the target drive position.
(4) Stops the calculation for correcting the angular velocity data using the reference value.
(5) Stops the calculation and update of the motion vector.
(6) Stops the calculation for generating the reference value.
(7) Stops supplying power to the angular velocity sensor 10.

After stopping the driving according to the above procedure, the control unit 320 causes the process to return to step S51.

Step S53: When detecting the on-state of the main switch, the control unit 320 starts supplying power to the angular velocity sensor 10 etc. An angular velocity signal of the angular velocity sensor 10 is converted to digital data by the A/D conversion unit 30 at a prescribed sampling interval.

Step S54: The control unit 320 judges the state of a half-depression switch (not shown) of the camera system 390.

If it is an off-state, the control unit 320 causes the process to move to step S51.

If it is an on-state, the control unit 320 causes the process to move to step S55.

Step S55: The reference value calculation unit 40 estimates a reference value Wo of angular velocity data obtained by the A/D conversion by subjecting it to moving averaging and low-pass filter processing.

Step S56: An interrupt occurs every time a new motion vector is calculated by the motion vector detection unit 160, and the motion vector values are updated.

The motion vector detection unit 160 calculates a motion vector according to the following procedure:

(1) The image sensor 150 repeatedly reads out shot images by thinning out read lines. These shot images are used for monitor display, exposure and focal point controls and a white balance adjustment control, moving image recording, etc.

(2) The motion vector detection unit 160 calculates a motion vector by detecting an image correlation or the like between successive frames of shot images. Examples of the motion vector detection method are a space/time gradient method and a block matching method.

(3) The motion vector conversion unit 170 acquires the focal length information 120 and the shooting magnification information 130 of the objective lens 390a. Using these pieces of information, the motion vector conversion unit 170 converts the motion vector (in the scale of the displacement on the imaging surface) to values in the same scale (angular velocity scale) as the reference value.

Step S57: The control unit 320 judges whether the vibration reduction is under driving or under suspension.

If the vibration reduction is under suspension because of, for example, a judgment result "panning" (described later), the control unit 320 causes the process to move to step S61.

On the other hand, if the vibration reduction is under driving, the control unit 320 causes the process to move to step S58.

Step S58: The control unit 320 measures an elapsed time from a start of driving for the vibration reduction and judges whether a prescribed suppression period has elapsed.

If the suppression period has not elapsed yet, the control unit 320 causes the process to move to step S59.

On the other hand, if the suppression period has elapsed, the control unit 320 causes the process to move to step S60.

It is preferable that driving for the vibration reduction be started (or restarted) not only in response to turning-on of the half-depression switch (at time t1 in FIG. 12) but also from a suspension state (caused by, for example, a judgment result "panning") of the vibration reduction (at time t4 in FIG. 12).

It is preferable that the suppression period be one of the following periods:

(Case 1) A period from a start of driving for the vibration reduction to a time point when shot images for which photoelectron accumulation was started after the start of driving for the vibration reduction start to be output from the image sensor 150 and acquisition of a motion vector from those shot images becomes possible.

Figure 13:
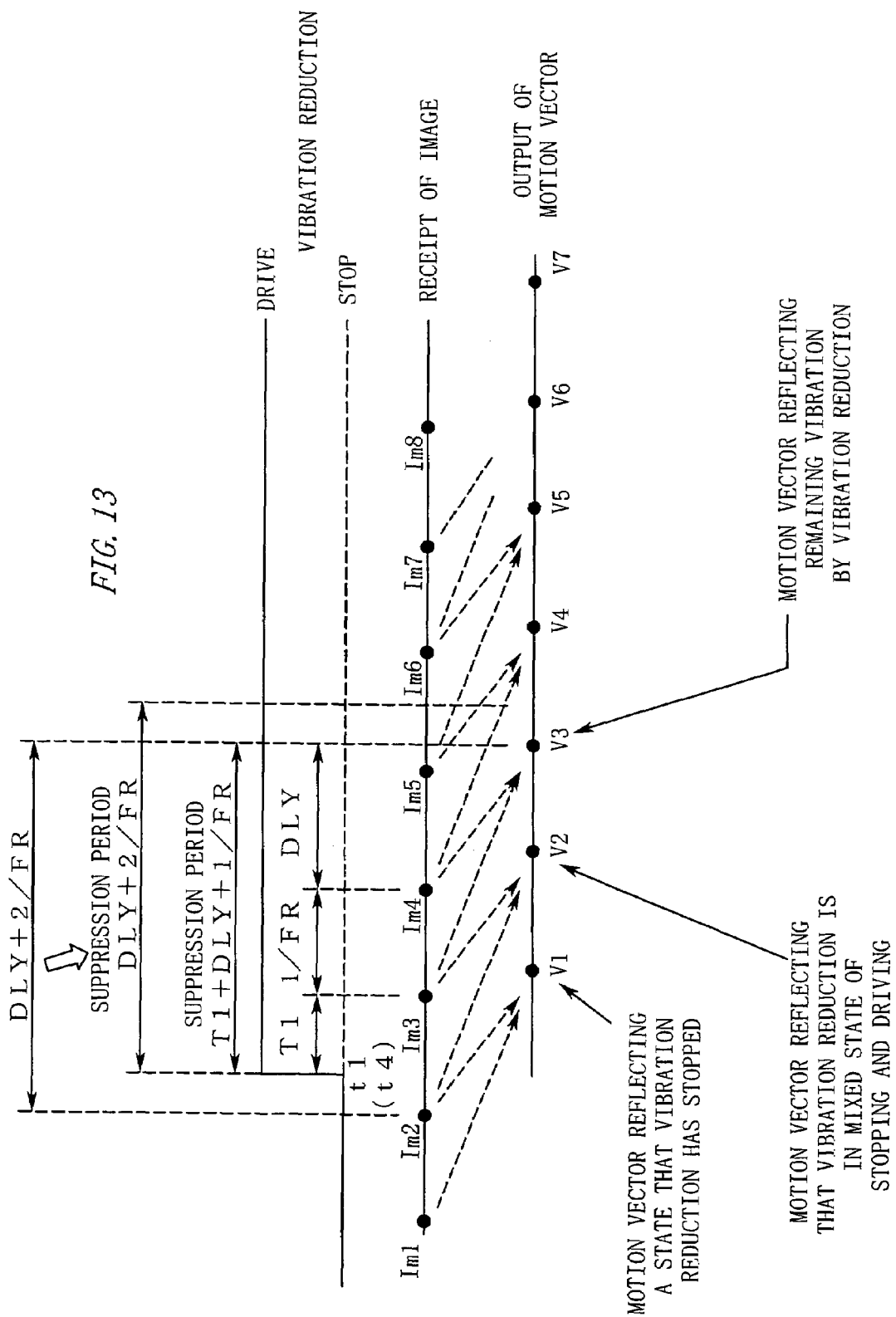
FIG. 13 is a timing chart showing a relationship between a suppression period and motion vectors.

(Case 2) A period from a start of driving for the vibration reduction to a lapse of at least (DLY+2/FR) (see FIG. 13). FR corresponds to the frame rate of the image sensor 150. DLY is a waiting time from capture of shot images to completion of calculation of a motion vector.

(Case 3) A period from a start of driving for the vibration reduction to a lapse of at least (T1+DLY+1/FR). T1 is a time lag from the start of driving for the vibration reduction to output of a first shot image for which photoelectron accumulation was started after the start of driving for the vibration reduction (see FIG. 13).

Step S59: The control unit 320 suppresses the feedback amounts of motion vectors during the suppression period.

It is preferable to employ, as a suppression method, one of the following processing 1 to processing 3, for example:

(Processing 1) Setting feedback amounts substantially equal to zero.

(Processing 2) Lowering the feedback gain (including a case of reducing the number of times of feedback per unit time) within such a range that disorder of the reference value does not cause a problem.

(Processing 3) Limiting fed-back motion signals within such a range that disorder of the reference value does not cause a problem.

Step S60: The reference value calculation unit 40 feeds back, to the reference value Wo, a motion vector B that has been processed by the feedback suppression unit 330.

For example, the reference value calculation unit 40 feeds back the motion vector B according to the following formula:

$$Wo' = Wo - b \quad (6)$$

where b is a component, in the vibration reduction direction, of the motion vector B.

Step S61: The target drive position calculation unit 50 calculates true angular velocity data, which is a cause of an image vibration, by subtracting a corrected reference value Wo' from angular velocity data that is output from the A/D conversion unit 30.

Step S62: The target drive position calculation unit 50 makes a panning judgment. In the panning judgment, whether or not the camera system 390 is moving continuously in one direction is judged on the basis of the angular velocity data. The method of the panning judgment is not limited to this method; for example, the panning judgment may be made on the basis of motion vectors.

If a judgment result "panning" is produced, the process moves to step S63.

On the other hand, if a judgment result "panning" is not produced, the process moves to step S64.

Step S63: The camera system 390 is panning. Therefore, the target drive position calculation unit 50 stops the driving of the optical vibration reduction system in the panning direction by keeping the target drive position constant. The process moves to step S66 with the driving of the optical vibration reduction system stopped.

Step S64: The camera system 390 is not in a panning state. Therefore, the following vibration reduction operation is performed.

First, the target drive position calculation unit 50 calculates an inclination angle of the optical axis of the objective lens 390a by integrating the true angular velocity data. The target drive position calculation unit 50 calculates a position (i.e., target drive position) of the optical vibration reduction system 100 that is necessary for canceling out a displacement of the image forming position of the object image.

Step S65: The drive signal calculation unit 60 acquires information on the target drive position from the target drive position calculation unit 50, and calculates a deviation between the target drive position and a current position of the optical vibration reduction system 100 that is acquired from the position detection unit 90. The drive signal calculation unit 60 outputs a drive signal for canceling out the deviation. The driver 70 generates a drive current from the drive signal and causes it to flow through the driving mechanism 80. Because of this drive control, the optical vibration reduction system 100 is caused to follow the target drive position.

Step S66: The control unit 320 judges the state of a full-depression switch (not shown) of the camera system 390.

If it is an off-state, the control unit 320 causes the process to return to step S51.

If it is an on-state, the control unit 320 causes the process to move to step S67.

Step S67: The control unit 320 shoots a still image by driving the image sensor 150 while continuing the above vibration reduction. After completion of this shooing operation, the control unit 320 causes the process to return to step S51.

Next, a relationship between a suppression period and motion vectors will be described with reference to FIG. 13.

The image sensor 150 sequentially outputs shot images Im1-Im8 at a shooting interval 1/FR. The motion vector detection unit 160 sequentially outputs motion vectors V1-V7; that is, the motion vector detection unit 160 captures immediately preceding two frames of shot images and outputs each motion vector after a lapse of a calculation waiting time DLY. Incidentally, in the example of FIG. 13, driving for the vibration reduction is started after the output of the shot image Im2. The vibration-reduced shot image Im3 is output after a lapse of a time T1 from the start of the driving for the vibration reduction.

In this case, calculated from the shot images Im1 and Im2 that were captured before the start of the driving for the vibration reduction, the motion vector V1 reflects a camera shake or the like that occurred before the vibration reduction's taking effect.

Calculated from the shot image Im2 that was captured before the start of the driving for the vibration reduction and the shot image Im3 that was captured after the start of the driving for the vibration reduction, the motion vector V2 reflects a transitional variation of the vibration that bridges periods before and after the start of the driving for the vibration reduction.

On the other hand, calculated from the shot images Im3, Im4, etc. that were captured after the start of the driving for the vibration reduction, the motion vector V3 and the following motion vectors reflect a residual vibration occurring in the vibration reduction state.

The period from the time point t1 (or t4) of the start of the driving for the vibration reduction to the acquisition of the motion vector V3 that reflects the residual vibration is equal to (T1+DLY+1/FR).

Therefore, suppressing the feedback amount of each motion vector at least during the period (T1+DLY+1/FR) makes it possible to prevent a large image motion occurring before the start of the driving for the vibration reduction from being mixed into the reference value and to thereby prevent the reference value from being disordered.

Further, canceling the above suppression after a lapse of the period (T1+DLY+1/FR) makes it possible to correct the reference value correctly using motion vectors that reflect a residual vibration.

The above-mentioned time T1 varies every time depending on the timing of the start of driving for the vibration reduction. In view of this, the maximum value 1/FR that the time T1 can take may be employed as a safety value instead of the time T1. In this case, a motion vector V4 that reflects a residual vibration can be obtained reliably by waiting for a lapse of a constant period (DLY+2/FR).

Figure 14:
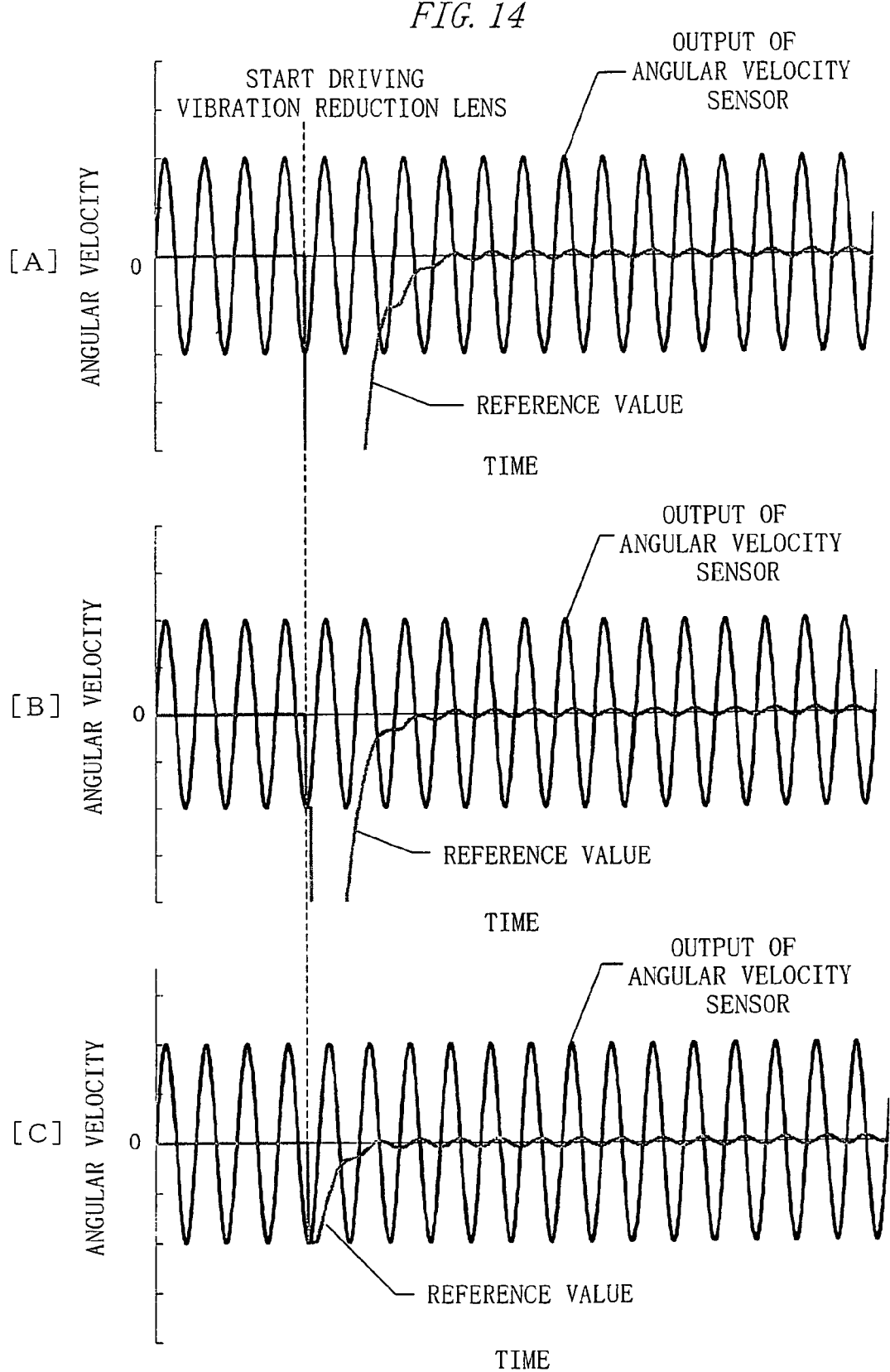
FIG. 14 shows advantages of increasing the speed of pulling-in of the reference value.

FIGS. 14[A]-14[C] are graphs obtained by computer simulations and showing reference value pull-in operations. Advantages of setting the suppression period will be described below with reference to FIGS. 14[A]-14[C].

FIG. 14[A] shows a case that no suppression period is set. That is, feeding-back of motion vectors are started immediately after a start of driving for the vibration reduction. In this case, the reference value instantaneously deviates to a large extent due to motion vectors that are produced before the start of the driving for the vibration reduction. As a result, pulling-in of the reference value takes long time. During the reference value pull-in period, the advantages of the vibration reduction are not obtained and the vibration is made worse contrary to the intention.

FIG. 14[B] shows a case that the feedback amount is suppressed in the period from a start of driving for the vibration reduction to a lapse of the waiting time DLY from it. Around the end of the waiting time DLY, a motion vector reflects a transitional variation that bridges periods before and after the start of the driving for the vibration reduction. Therefore, also in this case, the reference value deviates and pulling-in of the reference value takes long time. During the reference value pull-in period, the advantages of the vibration reduction are not obtained and the vibration is made worse contrary to the intention.

In contrast, FIG. 14[C] shows a case that the suppression period is set at (DLY+2/FR). Around the end of the suppression period, a motion vector has small values reflecting a residual vibration of the vibration reduction. As a result, the reference values does not deviate much and the reference value pull-in time can be shortened very much. The advantages of the vibration reduction can be obtained quickly.

Advantages etc. of Second Embodiment

In the second embodiment, as in the case of the first embodiment, a motion vector is fed back to the reference value. Therefore, the feedback path of the second embodiment is superior in the fundamental performance of the control system and is expected to provide a stable and proper control response.

Advantages specific to the second embodiment will be described below.

(1) First, the present inventors realized that if motion signals are fed back immediately when driving of the driving unit is started, the vibration reduction operation pull-in time takes longer time contrary to the intention. This is because motion signals produced around the start of the driving reflect a large image shake before the start of the driving for the vibration reduction.

Therefore, if motion signals produced around the start of the driving are fed back to the reference value as they are, the reference value itself is disordered to a large extent instead of eliminating a residual vibration in the reference value. As a result, the reference value takes terrible values temporarily and a vibration component that is calculated by using the reference value as a reference and even the target drive position are disordered greatly. In this state, the vibration reduction does not function normally and the vibration reduction operation is kept out of order until the once-disordered reference value is pulled into a correct value.

In view of the above, in the second embodiment, around a start of driving of the driving unit, the amount of feedback, to the reference value, of each motion signal is suppressed. The suppression is canceled after a time point when motion signals come to be acquired by analyzing shot images that were produced after the start of the driving of the driving unit.

By virtue of this operation, the feedback amount is suppressed until a motion signal shows a subtle residual vibration that reflects a reference value error. As a result, disorder of the reference value that would otherwise occur immediately after the start of the driving and the vibration reduction pull-in time can be shortened.

(2) Next, consideration will be given to a specific suppression period by assuming a case that a motion signal is obtained by comparing two frames of shot images.

First, it is necessary to acquire two frames of shot images after driving of the driving unit is started and an anti-vibration operation starts to take effect. First, a case is assumed that a shot image is output immediately before the start of the driving of the driving unit. The maximum time required for output of a first-frame shot image is equal to 1/FR where RF is the frame rate. Another 1/FR is necessary for a second-frame shot image to be output thereafter. Therefore, the maximum time that is necessary for obtaining two frames of shot images from the start of the driving of the driving unit is equal to 2/FR.

Then, a calculation waiting time DLY is necessary from the acquisition of the two frames of shot images to generation of a motion signal.

That is, waiting for a period (DLY+2/FR) from the start of the driving of the driving unit makes it possible to reliably obtain motion signals that reflect a residual vibration due to a reference value error. Therefore, in the second embodiment, it is preferable to suppress the feedback amount during the period (DLY+2/FR) from the start of the driving of the driving unit.

The above operation in which the maximum time required is taken into consideration makes it possible to prevent disorder of the reference value reliably even if the timing of acquisition of shot images varies.

(3) Next, consideration will be given to the probability of shortening of the above-described suppression period.

First, the time T1 that is taken from a time point when the driving unit starts its driving and an anti-vibration operation starts to take effect to output of a first-frame shot image can be timing-acquired from the camera side, for example. Another 1/FR is necessary for a second-frame shot image to be output thereafter. Therefore, the time that is necessary for obtaining two frames of shot images from the start of the driving of the driving unit is equal to (T1+1/FR).

Then, a calculation waiting time DLY is necessary from the acquisition of the two frames of shot images to generation of a motion signal. That is, waiting for an exact period (T1+DLY+1/FR) from the start of the driving of the driving unit makes it possible to obtain motion signals that reflect a residual vibration due to a reference value error. Therefore, in the second embodiment, it is preferable to suppress the feedback amount at least during the period (T1+DLY+1/FR) from the start of the driving of the driving unit.

The above operation in which the exact time required is taken into consideration makes it possible to cancel the suppression of the feedback amount as early as possible.

(4) In the second embodiment, it is preferable to suppress the feedback amount by one of the following means:

1. Setting the feedback amount (substantially) equal to zero.
2. Lowering the feedback gain.
3. Limiting a motion signal to feed back.

The employment of one of the above suppressing means makes it possible to prevent disorder of the reference value reliably.

Supplements to Embodiments

In the above-described embodiments, a motion vector is generated on the basis of shot images of the image sensor ISO. However, the invention is not limited to such a case.

For example, shot images may be generated by performing photoelectric conversion by means of a divisional photometric mechanism, a focal point detection mechanism, a colorimetric mechanism, or a finder mechanism of a camera system. The invention can be implemented in a (silver-halide) film camera or a single-lens reflex electronic camera by generating a motion vector from such shot images.

If the camera side has a continuous shooting ability of 2-8 frames, motion signals can be obtained with a shooting interval that is necessary for correction of the reference value. Therefore, the invention can be applied to a type of camera in which optical vibration reduction is performed continuously while continuous shooting is performed.

In the above embodiments, the objective lens and the camera system may be integral with each other. Alternatively, they may be detachable from each other. In the latter case, the block for generating a motion signal may be provided in either the objective lens or the camera system. One form of implementation is such that the block for generating a motion signal is provided in the camera system and the block for converting a motion signal to a signal in the same scale as the reference value is provided in the objective lens.

In the above-described embodiments, an angular velocity is detected as a vibration detection signal. However, the invention is not limited to such a case; it is satisfactory to detect a vibration component that enables estimation of a displacement of the image forming position of an object image. For example, it is satisfactory to detect, as a vibration detection signal, acceleration, angular acceleration, centrifugal force, or inertial force that acts on the camera system.

In the above-described embodiments, the vibration reduction is performed by shifting or tilting a light beam (light image) of the objective lens. However, the invention is not limited to such a case. For example, the vibration reduction may be performed by shifting the image sensor.

In the above-described embodiments, a motion vector is detected from two frames of shot images. However, the invention is not limited to such a case. A motion vector may be detected from an image flow in one frame. As a further alternative, a motion vector may be detected by comparing three or more frames of shot images with each other.

In the invention, the feedback amount of a motion signal may be controlled by using both of the frame rate and the suppression period.

In the above-described embodiments, the frame rate or periods before and after a start of vibration reduction are monitored as an analytical condition of a motion signal and the feedback amount of a motion signal is changed in accordance with a difference in the analytical condition. However, the analytical condition is not limited to the above ones. For example, the feedback amount of a motion signal may be suppressed adaptively by detecting, from the analytical condition, a situation that motion signals are disordered or increase unduly. This kind of operation can also realize a vibration reduction apparatus that is less prone to be influenced by a variation (disorder) of motion signals.

In the above-described second embodiment, the suppression of the feedback amount may be canceled at any time after a lapse of the suppression period. However, to correct the reference value as early as possible, it is preferable to cancel the suppression of the feedback amount immediately after the end of the suppression period.

The invention is not limited to the above embodiments and various modifications may be made without departing from the spirit and scope of the invention. Any improvement may be made in part or all of the components.

What is claimed is:

1. A vibration reduction apparatus to reduce an image vibration of an object image in an imaging unit of a camera, comprising:
    a vibration reduction mechanism that changes a relative position between said imaging unit and a light beam forming the object image;
    a vibration detection unit that detects a vibration of said camera and outputs a vibration detection signal;
    a reference value generation unit that estimates a reference value of said vibration detection signal according to said vibration detection signal, said reference value being an output of said vibration detection unit in a stationary state that is free of the vibration;
    a target drive position calculation unit that calculates a vibration component as a cause of the image vibration from a difference between said vibration detection signal and an estimated reference value, and calculates a target drive position of said vibration reduction mechanism according to the vibration component;
    a driving unit that controls said vibration reduction mechanism to follow the target drive position;
    a feedback path that acquires information on a motion signal and feeds back said motion signal to the reference value generation unit to thereby correct the reference value, the information on a motion signal being acquired by analyzing a shot image of said camera; and
    a feedback control unit that suppresses a feedback amount of said motion signal to the reference value generation unit when said driving unit starts driving, and cancels suppression of the feedback amount after acquiring a motion signal generated by analyzing a shot image produced after the start of driving.

2. The vibration reduction apparatus according to claim 1, wherein said feedback control unit acquires information on a frame rate of the shot image and changes the feedback amount of said motion signal to the reference value generation unit in accordance with a change in the frame rate.

3. The vibration reduction apparatus according to claim 2, wherein said feedback control unit decreases the feedback amount as the frame rate decreases.

4. The vibration reduction apparatus according to claim 3, wherein said feedback control unit decreases the feedback amount more gently as the frame rate decreases.

5. The vibration reduction apparatus according to claim 2, wherein said feedback control unit sets the feedback amount at zero if the frame rate is lower than a predetermined threshold value.

6. The vibration reduction apparatus according to claim 2, wherein said feedback control unit sets a feedback gain G of said motion signal in said feedback path according to a formula $$G = a \cdot F + b$$

where a and b are constants and F is the frame rate of the shot image.

7. The vibration reduction apparatus according to claim 1, wherein said feedback control unit suppresses the feedback amount at least during a period (DLY+2/FR) from when said driving unit has started driving, where FR is the frame rate of said shot image and DLY is a waiting time from capture of the shot image to generation of said motion signal.

8. The vibration reduction apparatus according to claim 1, wherein said feedback control unit suppresses the feedback amount at least during a period (T1+DLY+1/FR) from when said driving unit has started driving, where T1 is a time lag from when said driving unit has started driving to when a first shot image produced after the start of driving is acquired, FR is the frame rate of the shot image, and DLY is a waiting time from capture of the shot image to generation of said motion signal.

9. A camera system comprising:
    said vibration reduction apparatus according to claim 1; and
    a camera that performs vibration reduction using said vibration reduction apparatus.

10. The vibration reduction apparatus according to claim 1, wherein said feedback control unit suppresses the feedback amount by setting the feedback amount at zero.

11. The vibration reduction apparatus according to claim 1, wherein said feedback control unit suppresses the feedback amount by lowering the feedback amount at zero.

12. The vibration reduction apparatus according to claim 1, wherein said feedback control unit suppresses the feedback amount by limiting said motion signal feedback to the reference value generation unit.

13. A method for reducing an image vibration of an object image in an imaging unit of a camera, comprising:

changing a relative position between the imaging unit and a light beam forming the object image;

detecting a vibration of the camera and outputting a vibration detection signal;

estimating a reference value of the vibration detection signal according to the vibration detection signal, the reference value corresponding to a stationary state that is free of vibration;

calculating a vibration component as a cause of the image vibration from a difference between the vibration detection signal and the estimated reference value, and calculating a target drive position of a vibration reduction mechanism according to the vibration component;

controlling the vibration reduction mechanism to follow the target drive position;

acquiring information on a motion signal and feeding back the motion signal to correct the reference value, the information on a motion signal being acquired by analyzing a shot image of the camera; and suppressing a feedback amount of the motion signal at the start of driving, and cancelling suppression of the feedback amount after acquiring a motion signal generated by analyzing a shot image produced after the start of driving.

14. The method according to claim 13, wherein said suppressing comprises acquiring information on a frame rate of the shot image and changing the feedback amount of the motion signal in accordance with a change in frame rate.

15. The method according to claim 14, wherein said suppressing decreases the feedback amount as the frame rate decreases.

16. The method according to claim 15, wherein said suppressing decreases the feedback amount more gently as the frame rate decreases.

17. The method according to claim 14, wherein said suppressing sets the feedback amount at zero if the frame rate is lower than a predetermined threshold value.

18. The method according to claim 14, wherein said suppressing sets a feedback gain G of said motion signal in said feedback path according to a formula $G = a \cdot F + b$ where a and b are constants and F is the frame rate of the shot image.

19. The method according to claim 13, wherein said suppressing suppresses the feedback amount at least during a period (DLY+2/FR) from when the driving unit has started driving, where FR is the frame rate of the shot image and DLY is a waiting time from capture of the shot image to generation of the motion signal.

20. The method according to claim 13, wherein said suppressing suppresses the feedback amount at least during a period (T1+DLY+1/FR) from when the driving unit has started driving, where T1 is a time lag from when the driving unit has started driving to when a first shot image produced after the start of driving is acquired, FR is the frame rate of the shot image, and DLY is a waiting time from capture of the shot image to generation of the motion signal.

21. A vibration reduction apparatus to reduce an image vibration of an object image in an imaging unit of a camera, comprising:

a vibration reduction mechanism that changes a relative position between the imaging unit and a light beam forming the object image;

a vibration detection unit that detects a vibration of the camera and outputs a vibration detection signal;

a reference value generation unit that estimates a reference value when the vibration detection unit is in a stationary state;

a target drive position calculation unit that calculates a target drive position of said vibration reduction mechanism based on the vibration detection signal and the estimated reference value;

a driving unit that controls said vibration reduction mechanism to follow the target drive position;

a feedback path that acquires information on a motion signal by analyzing a shot image of the camera and feeding back the motion signal to the reference value generation unit to correct the reference value; and a feedback control unit that suppresses a feedback amount of the motion signal to the reference value generation unit when said driving unit starts driving, and cancels suppression of the feedback amount after acquiring a motion signal generated by analyzing a shot image produced after the start of driving.

* * * * *

UNITED STATES PATENT AND TRADEMARK OFFICE
CERTIFICATE OF CORRECTION

| | | |
|---|---|---|
| PATENT NO. | : 7,522,188 B2 | Page 1 of 1 |
| APPLICATION NO. | : 11/144657 | |
| DATED | : April 21, 2009 | |
| INVENTOR(S) | : Hiroyuki Tomita et al. | |

It is certified that error appears in the above-identified patent and that said Letters Patent is hereby corrected as shown below:

Column 21, Line 34, after "change in" insert --the--.

Signed and Sealed this

Fourth Day of August, 2009

JOHN DOLL
*Acting Director of the United States Patent and Trademark Office*